United States Patent
Hutelmyer et al.

(10) Patent No.: US 12,166,774 B2
(45) Date of Patent: Dec. 10, 2024

(54) NETWORK SECURITY SYSTEMS FOR ATTRIBUTING NETWORK EVENTS TO USERS

(71) Applicant: Target Brands, Inc., Minneapolis, MN (US)

(72) Inventors: Paul Hutelmyer, Minneapolis, MN (US); Adam Blake, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 260 days.

(21) Appl. No.: 17/993,627

(22) Filed: Nov. 23, 2022

(65) Prior Publication Data

US 2023/0239311 A1    Jul. 27, 2023

Related U.S. Application Data

(60) Provisional application No. 63/302,839, filed on Jan. 25, 2022.

(51) Int. Cl.
*H04L 9/40* (2022.01)
(52) U.S. Cl.
CPC ...... *H04L 63/1416* (2013.01); *H04L 63/1441* (2013.01)
(58) Field of Classification Search
CPC . H04L 63/14; H04L 63/1416; H04L 63/1441; H04L 63/1408
See application file for complete search history.

(56) References Cited

U.S. PATENT DOCUMENTS

| | | | |
|---|---|---|---|
| 9,456,000 B1 | 9/2016 | Spiro et al. | |
| 9,531,758 B2 | 12/2016 | Devarajan et al. | |
| 10,511,607 B2 | 12/2019 | Bansal et al. | |
| 10,666,668 B2 | 5/2020 | Muddu et al. | |
| 11,038,925 B2 | 6/2021 | Brannon et al. | |
| 2016/0127417 A1* | 5/2016 | Janssen | H04L 63/1433 726/1 |
| 2017/0195355 A1* | 7/2017 | Wang | H04L 63/145 |
| 2019/0050775 A1* | 2/2019 | Bijor | H04L 67/34 |
| 2019/0387008 A1 | 12/2019 | Visbal et al. | |
| 2023/0025607 A1* | 1/2023 | Saia | H04L 51/214 |
| 2023/0095870 A1* | 3/2023 | Du | H04L 63/1416 726/23 |
| 2023/0231854 A1* | 7/2023 | Blake | H04L 63/1425 726/4 |

* cited by examiner

*Primary Examiner* — Kostas J Katsikis
(74) *Attorney, Agent, or Firm* — Barnes & Thornburg LLP

(57) ABSTRACT

Disclosed are techniques for associating users of a network infrastructure to network or endpoint events within the network infrastructure. A method can include receiving, by a network security system that monitors and protects the network infrastructure, a packet for a network event, the packet including (i) information identifying a user device from which the network event originates and (ii) a payload, determining whether the packet triggers at least one association rule in a group of association rules, determining candidate users to be associated with the network event based on the rule triggered by the packet, determining confidence values for the candidate users to be associated with the network event based on the rule triggered by the packet, and returning the candidate users to associate with the network event and the corresponding confidence values.

20 Claims, 10 Drawing Sheets

NETWORK SECURITY SYSTEMS FOR ATTRIBUTING NETWORK EVENTS TO USERS

CROSS-REFERENCE TO RELATED APPLICATIONS

This application claims priority to U.S. Provisional Application Ser. No. 63/302,839, filed on Jan. 25, 2022, the disclosure of which is incorporated by reference in its entirety.

TECHNICAL FIELD

This document generally describes devices, systems, and methods related to computer network security, such as monitoring network activity and attributing the network activity to users in an enterprise.

BACKGROUND

Organization security posture includes policies, practices, and devices adapted to monitor and prevent unwanted access, misuse, modification, or attacks on computer networks and network-accessible resources. Network security involves differentiating and restricting between authorized and unauthorized access to data and services in a network, which can be controlled by one or more authentication schemes. Malicious actors are users that are not authorized to access the network (or particular data and resources of the network) but who nevertheless attempt to circumvent the network's implemented security controls in order to gain access to the network, either by thwarting network security measures or circumventing them by, for example, getting an authorized user to unwittingly perform actions that provide malicious actors with access. For example, malicious actors may either directly attempt to thwart network security measures, such as through an arbitrary execution exploit, or indirectly attempt to gain access through an authorized user, such as through a phishing scheme. Sometimes, malicious actors can come from within an enterprise and can exploit the enterprise's network to their advantage and/or for malicious purposes.

Computer and endpoint security in an organization can include both proactive and reactive security measures that either block security threats before they exploit a security vulnerability, or the security measures are deployed once the vulnerability has been exploited to mitigate the exploit. Such proactive and reactive security measures can be performed automatically and/or manually, such as by security analysts who are experts in identifying and eliminating security threats in a network. Security analysts can perform a variety of tasks, such as investigating potential security vulnerabilities and instances of potential malicious attacks, differentiating between benign and malicious network activity, and formulating response strategies when malicious attacks are found.

SUMMARY

The document generally relates to technology for attributing detected network and endpoint events to users in an enterprise environment. The disclosed technology can generate dynamically adjusted associations, using information and/or metadata in detected network events, with users in the enterprise. The information and/or metadata can include any of a variety of information, such as IP addresses, email addresses, names, account names, device identifiers, and/or other potentially unique identifiers both internal and external to the enterprise. This information and/or metadata can be correlated and stitched together to identify one or users that may be associated with the detected network and endpoint events, which may lack express user identifiers within the network events themselves. Using the disclosed technology, users of the enterprise may be objectively identified and linked to network and endpoint events in their existing format, and without requiring the network events to be changed to include private, personal information about the users. By accurately attributing network events to specific users, better risk assessment can be made as to whether the network event poses potential risks based, at least in part, on risks that are associated with users. Accordingly, the disclosed technology provides for identifying, assessing, preventing, and/or responding to network and endpoint events that pose security threats within the enterprise environment.

More specifically, the disclosed technology provide a network security system for applying various tests (e.g., rules) to received network and endpoint events to determine whether a user is associated with a network event and assign a confidence value for user-to-event associations. The tests can be implemented to analyze IP addresses, names, email addresses, and/or other unique identifiers that are associated with network events and attribute those events to one or more users in the enterprise. Confidence values that are determined as a result of performing each test can be aggregated to determine an overall confidence value that a particular user is likely associated with a particular network event. Overall confidence values for users associated with the particular network or endpoint event can be analyzed to determine which of the users should be attributed to the network event. This determination can be made based on which user has the highest overall confidence value. This determination can also be made based on other factors, including but not limited to a risk score associated with each of the users and/or risk levels of the network event.

As an example, the network security system can provide for analyzing payloads of network events, analyzing device-to-IP logs, and making user-to-event associations based on analysis of the payloads and logs. The network security system can determine confidence values that one or more users are associated with a network event based on such analysis. The user-to-event associations and the corresponding confidence values can be used by a risk assessment system to determine risk levels associated with the users. Moreover, the risk assessment system can determine which user should be attributed to the network event based on their respective risk level.

Furthermore, payloads of network events can be analyzed by the network security system to identify a sender IP address. Analyzing the device-to-IP logs can indicate which device was associated with the sender IP address at a particular timestamp. Thus, a user associated with the sender IP address and the device can be identified as a candidate user-to-event association. In some implementations, the user may try sending information via a proxy, which can obfuscate the sender IP address. In such scenarios, the network security system can identify a packet size and/or frequency of particular outgoing network traffic and match that packet size and/or frequency with incoming network traffic. The network security system can then determine a user-to-event association based on the matching described above, rather than relying on identification of the sender IP address.

In some implementations, the payloads of network events can also be analyzed by the network security system to identify potentially unique user identifiers in the enterprise. The potentially unique user identifiers can be emails, names, etc. that are internal to the enterprise. If users in the enterprise match at least part of the unique user identifiers, such as a last name, the network security system can identify those users as potentially being associated to a network event. These associations can be made with high confidence if a small quantity of the users at least partially match the unique user identifiers. The network security system can also identify unique user identifiers in the payloads that are external to the enterprise, such as private email addresses. If users in the enterprise are associated with those identifiers, then the network security system can associate those users with the network event. These associations can also be made with high confidence if a small quantity of the users are associated with those identifiers. On the other hand, these associations can be made with low confidence if many users are associated with those identifiers. Sometimes, these associations may not be made at all if too many users are associated with those identifiers.

As an illustrative example, if a user emails an external private email account multiple times over 5 years ago, it may be less likely that the user is associated with a recent network event involving the external private email account. The user may be associated with the network event with a low confidence value. Sometimes, the user may not even be associated with the network event because frequency and/or timeliness of this network event was low for the particular user. On the other hand, if the user is the only one in the enterprise who emails the external private email account and the user emails that account frequently and/or recently, the network security system can associate the user with the particular network event. This association can be made with a high confidence value since no one else, or very few other users, in the enterprise have sent emails to the external private email account as frequently and/or as recently as the user.

One or more embodiments described herein can include a method for associating users of a network infrastructure to network events and endpoint events within the network infrastructure, the method including: receiving, by a network security system that can monitor and protect the network infrastructure, a packet for a network event in the network infrastructure, the packet including (i) information identifying a user device from which the network event originates and (ii) a payload, determining, by the network security system, whether the packet triggers at least one association rule in a group of association rules, determining, by the network security system, one or more candidate users to be associated with the network event based on the at least one association rule triggered by the packet, determining, by the network security system, one or more confidence values for the one or more candidate users to be associated with the network event based on the at least one association rule triggered by the packet, and returning, by the network security system, the one or more candidate users to associate with the network event and the one or more confidence values.

In some implementations, the embodiments described herein can optionally include one or more of the following features. For example, the information identifying the user device can include an IP address. The payload can include at least one of a username of the network infrastructure, a username of an external service, an email address of the network infrastructure, an email address of an external email service, a first name, and a last name.

In some implementations, determining, by the network security system, whether the packet triggers at least one association rule in a group of association rules can include analyzing incoming and outgoing packets. For example, analyzing incoming and outgoing packets can include: identifying, by the network security system, at least one of a packet size and a packet frequency of an incoming packet, identifying, by the network security system, at least one of a packet size and a packet frequency of an outgoing packet, and determining, by the network security system, whether at least one of the packet size and the packet frequency of the incoming packet is within a threshold range of at least one of the packet size and the packet frequency of the outgoing packet. The method can also include associating, by the network security system, the incoming packet with the outgoing packet based on a determination that at least one of the packet size and the packet frequency of the incoming packet is within the threshold range of at least one of the packet size and the packet frequency of the outgoing packet. The method may also include identifying, by the network security system, a user from at least one of an IP address and a payload of the outgoing packet and associating, by the network security system, the user with the incoming packet and the outgoing packet.

As another example, determining, by the network security system, whether the packet triggers at least one association rule in a plurality of association rules can include analyzing the payload. Analyzing the payload can include: identifying, by the network security system, a unique user identifier for the network infrastructure in the payload, associating, by the network security system, a user having the unique user identifier with the network event, and determining, by the network security system, a confidence value for the candidate user-to-event association that is greater than a threshold value. The unique user identifier can be at least one of a username of the network infrastructure and an email address of the network infrastructure. Moreover, analyzing the payload can include: identifying, by the network security system, names included in the payload, identifying, by the network security system, user profiles in the network infrastructure that at least partially match the names, determining, by the network security system, whether a quantity of the identified user profiles is less than a threshold quantity, associating, by the network security system, the identified user profiles with the network event, and determining, by the network security system, a confidence value for each of the candidate user-to-event associations that is greater than a threshold value. In some implementations, the names can include at least one of a first name, a last name, a first initial, a last initial, and any combination thereof.

As another example, analyzing the payload can include: identifying, by the network security system, a unique external user identifier in the payload, identifying, by the network security system, user profiles in the network infrastructure that include the unique external user identifier, determining, by the network security system, whether a quantity of the identified user profiles is less than a threshold quantity, associating, by the network security system, the identified user profiles with the network event, and determining, by the network security system, a confidence value for each of the candidate user-to-event associations that is greater than a threshold value. Moreover, the method can include associating, by the network security system, the identified user profiles with the network event based on a determination that the quantity of the identified user profiles is greater than the threshold quantity and determining, by the network security system, a confidence value for each of the candidate user-to-event associations that is less than the threshold value. Sometimes, the unique external user identifier can be at least one of a private email address, an external username, and an external account identifier.

As another example, determining, by the network security system, whether the packet triggers at least one association rule in a plurality of association rules can include analyzing a device-IP log. Analyzing the device-IP log can include: analyzing, by the network security system, the packet to identify a sender IP address and an event timestamp, identifying, by the network security system, at least one device in the device-IP log within a threshold period of time from the timestamp, and determining, by the network security system, one or more candidate users to be associated with the network event based on associating the sender IP address with the at least one identified device in the device-IP log. The threshold period of time from the timestamp can be +−5 minutes. Determining, by the network security system, one or more candidate users to be associated with the network event can include identifying at least one user profile assigned to the at least one device. Determining, by the network security system, one or more candidate users to be associated with the network event can also include identifying at least one user profile logged into the at least one device within the threshold period of time from the timestamp.

In some implementations, determining, by the network security system, one or more confidence values for the one or more candidate users to be associated with the network event can include assigning at least one of the one or more confidence values above a threshold level based on a determination that a name in the payload is attributed to a quantity of user profiles in the network infrastructure that is less than a threshold quantity. As another example, determining, by the network security system, one or more confidence values for the one or more candidate users to be associated with the network event can include assigning at least one of the one or more confidence values above a threshold level based on a determination that (i) information in the payload is attributed to a quantity of user profiles in the network infrastructure that is less than a threshold quantity and (ii) a frequency that the information in the payload is attributed to the quantity of user profiles in the network infrastructure is greater than a threshold frequency. As yet another example, determining, by the network security system, one or more confidence values for the one or more candidate users to be associated with the network event can include assigning at least one of the one or more confidence values above a threshold level based on a determination that (i) information in the payload is attributed to a quantity of user profiles in the network infrastructure that is less than a threshold quantity, (ii) a frequency that the information in the payload is attributed to the quantity of user profiles in the network infrastructure is greater than a threshold frequency, and (iii) a window of time in which the information in the payload is attributed to the quantity of user profiles in the network infrastructure is within a threshold time period.

In some implementations, the confidence value can be a Boolean value of Pass or Fail. The confidence value can also be a numeric value on a scale of 0-100. The method may also include selecting, by the network security system, at least one of the one or more candidate users to associate with the network event based on a confidence value of the at least one candidate user exceeding a threshold confidence value. Additionally, the method can include determining, by the network security system, a risk level of the network event and assigning, by the network security system, the risk level of the network event to the at least one user based on the confidence value of the at least one user exceeding confidence criteria.

In some implementations, the method can include retrieving, by the network security system, confidence values for a user of the one or more candidate users based on the packet triggering association rules in the group of association rules, summing, by the network security system, the confidence values for the user to generate an overall confidence value that the user is associated with the network event, and returning, by the network security system, the overall confidence value for the user. The method may also include retrieving, by the network security system, overall confidence values for users that are associated with the network event or an endpoint event, identifying, by the network security system, a user having a confidence value that exceeds a threshold confidence level, and attributing, by the network security system, the network event or the endpoint event to the identified user. Attributing, by the network security system, the network event or the endpoint event to the identified user can include assigning risk associated with the network event or the endpoint event to the identified user.

One or more embodiments described herein can include a system for associating users of a network infrastructure to network events or endpoint events within the network infrastructure, the system including: at least one processor and a memory device storing instructions that are operable, when executed by the at least one processor one or more computers, to cause the at least one processor to perform operations that include: receiving a packet for a network event in the network infrastructure, the packet including (i) information identifying a user device from which the network event originates and (ii) a payload, determining whether the packet triggers at least one association rule in a group of association rules, determining one or more candidate users to be associated with the network event based on the at least one association rule triggered by the packet, determining one or more confidence values for the one or more candidate users to be associated with the network event based on the at least one association rule triggered by the packet, and returning the one or more candidate users to associate with the network event and the one or more confidence values.

In some implementations, the system can optionally include one or more of the abovementioned features.

The devices, system, and techniques described herein may provide one or more of the following advantages. For example, the disclosed technology can provide for objectively identifying and attributing users of the enterprise to network events that pose security threats in the enterprise environment. The users can be objectively identified using unique identifiers including but not limited to IP addresses, emails, account names, and network event packet size and/or frequency information. Therefore, the users can be attributed to network events without having to use personal or private information associated with the users. This can preserve user privacy rights and increase an amount of data associations that can be made and attributed to a particular user.

Similarly, the disclosed technology provides for correlating seemingly anomalous data from a variety of systems and attributing that data to a particular user in the enterprise. This can provide for robust data analysis and identification of insider threats in the enterprise. For example, since IP addresses can change, the network security system can look at various data sources, such as device-to-IP logs, to identify an IP address that is associated with a device (and thus a user) at or around a timestamp of a particular network event. By tapping into different data sources, the network security system can determine a host device and then a user who is assigned the host device and/or was logged into the host device at or around the timestamp of the particular network event to associate the user to the network event with high confidence.

The disclosed techniques can also provide for aggregating determinations from different security tests or rules to make meaningful and high confidence associations between users in the enterprise environment and network events within the enterprise environment. As a result, the enterprise can accurately and effectively assess which users are linked to security threats in the enterprise and what type of threat(s) the users pose to the enterprise. This can provide for accurate and effective identification, prevention, and/or remediation of security threats that are internal to the enterprise environment.

As another example, the disclosed techniques can be used by an engineer or other relevant user to separate signals from normal noise between internal and external communications. For example, the engineer can identify control avoidance by means of standing up a new email address or endpoint for exclusive or primary use of exfiltrating data. As another example, the engineer can identify avoidance of blocks that are put in place for known personal endpoints and/or email addresses using the disclosed techniques.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to a network and endpoint security system for attributing network or endpoint events to users within an enterprise environment. The network security system can provide for running various tests (e.g., rules) on network event information to identify unique identifiers, link them to users in the enterprise, and accordingly associate the users with network events. These associations can be assigned confidence values, which can be used to determine, by the network security system, which user should be attributed to a particular network event. Once the user is attributed to the particular network event, relevant stakeholders in the enterprise environment can take action to prevent and/or remediate the particular network event. Moreover, since the user may pose an insider security threat to the enterprise, the relevant stakeholders can take action to monitor the user and proactively respond to suspicious activity of the user.

Figure 1:
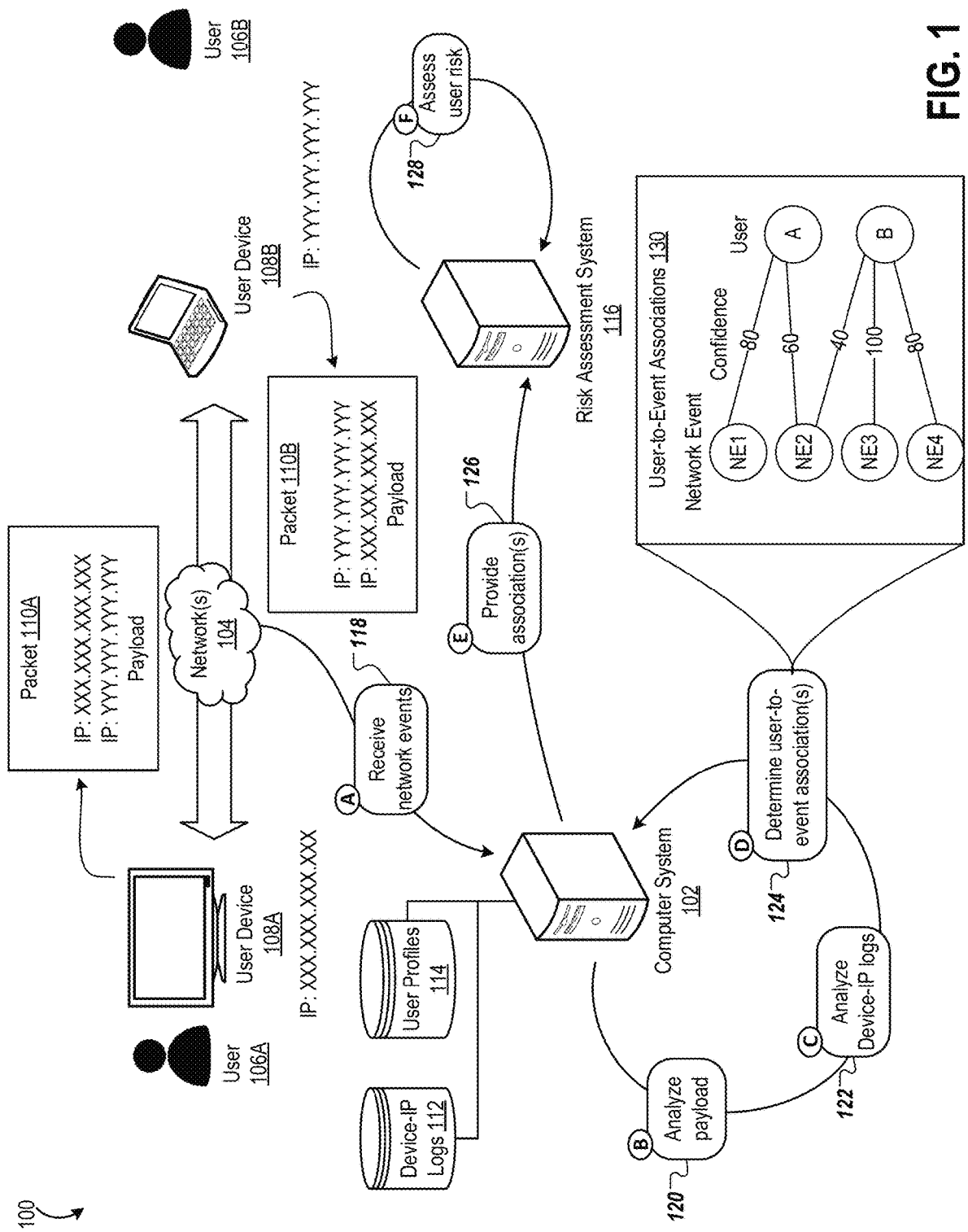
FIG. 1 is a conceptual diagram for attributing users to network events in an enterprise environment.

Referring to the figures, FIG. 1 is a conceptual diagram for attributing users to network events in an enterprise environment 100. The enterprise environment 100 can be a network system or other computing environment of an organization. The enterprise environment 100 can be a closed network. A computer system 102, user devices 108A and 108B, device-IP logs data store 112, user profiles data store 114, and risk assessment system 116 can communicate (e.g., wired and/or wirelessly) in the enterprise environment 100 via network(s) 104. One or more of the components 102, 108A-B, 112, 114, and/or 116 can be part of a local area network (LAN) of the enterprise environment 100. One or more of the components 102, 108A-B, 112, 114, and/or 116 may also be external or outside of a network of the enterprise environment 100.

The computer system 102 can be deployed in the enterprise environment 100 to provide security monitoring and/or response capabilities. In some implementations, the computer system 102 can be a network security system. The computer system 102 can be a computing system in a network of the enterprise environment 100 or remote from the enterprise environment 100. The computer system 102 may also be a cloud-based system and/or service. The computer system 102 can perform a variety of tasks described throughout this disclosure, including but not limited to monitor incoming and/or outgoing network activity and associating that network activity to specific users in the enterprise environment 100.

The user devices 108A and 108B can be any type of computing device (e.g., computer, tablet, laptop, smartphone, mobile phone, etc.) that can be used by users 106A and 106B. Any of the users 106A and 106B can be associated with the enterprise environment 100, such as employees. Sometimes, one or more of the users 106A and 106B may not be associated with the enterprise environment 100. Such users may be unauthorized recipients who, for example, may not have access rights to confidential information within the enterprise environment 100. As another example, such users may be malicious or at risk users who work with one or more employees of the enterprise environment 100.

Any of the user devices 108A and 108B can be corporate devices, which may be owned by or otherwise operated within the enterprise environment 100 and provided to employees, such as an enterprise-owned laptop. And of the user devices 108A and 108B can also be personal devices that the users 106A and/or 106B bring to the enterprise environment 100 to perform functions of the employees' roles (e.g., where the enterprise environment 100 has a Bring Your Own Device to work policy (BYOD)). The personal device, for example, can connect to various systems and other computing devices within the enterprise environment 100 via the network(s) 104.

The device-IP logs data store 112 can contain data including IP addresses of every computing device (and thus user) that accessed or attempted to access the network 104, websites, or other processes within the network environment 100. The data can be in the form of logs, which can be used to determine sources of security attacks, patterns of attacks, and provide early warning about such attacks. Here, for example, the logs can be used to look back through time, by the computer system 102, and determine IP addresses of devices that were associated with particular network events at timestamps of those network events.

The user profiles data store 114 can maintain profiles of each user (e.g., employee) in the enterprise environment 100. The profiles can include information such as a user's name, email address(es), associated device identifiers (IDs), associated IP address(es), associated and/or attributed network event(s), risk level(s) associated with such network event(s), etc. Once the computer system 102 identifies the IP address of a device associated with a particular network event using logs from the device-IP logs data store 112, the computer system 102 can match the IP address to one or more user profiles in the data store 114. Any matches can be identified as user-to-event associations for the particular network event.

The risk assessment system 116 can be a computing system configured to determine and assess risk of users and/or network events within the enterprise environment 100. The risk assessment system 116 can, for example, determine how much of a security threat a particular user and/or network event poses to the enterprise environment 100. The risk assessment system 116 can be part of the computer system 102. The risk assessment system 116 can also be a separate computing system from the computer system 102. In some implementations, the enterprise environment 100 may not include the risk assessment system 116 and instead, functions of the system 116 can be performed by the computer system 102.

Still referring to FIG. 1, the users 106A and 106B can transmit information back and forth over the network(s) 104. For example, when the user 106A transmits information to the user 106B, a packet 110A is formed at the user device 108A of the user 106A and transmitted through the network(s) 104 to the user device 108B. The packet 110A can include information associated with this network event, including but not limited to a sender IP address (which, in this example, is the user device 108A IP address of XXX.XXX.XXX.XXX), a receiver IP address (the user device 108B IP address of YYY.YYY.YYY.YYY), and a payload. The user 106B can also transmit information over the network(s) 104 to the user 106A, in which the user device 108B can transmit packet 110B over the network(s) 104 to the user device 108A. The packet 110B can include similar information as the packet 110A, including but not limited to a sender IP address (the user device 108B IP address of YYY.YYY.YYY.YYY), a receiver IP address (the user device 108A IP address of XXX.XXX.XXX.XXX), and a payload.

The packets 110A and 110B can be received as network events in block A (118). The computer system 102 can receive these network events from the network(s) 104. In some implementations, the computer system 102 can poll the network(s) 104 for the network events at predetermined time intervals (e.g., every 30 minutes, every 1 hour, every 2 hours, every 6 hours, every 12 hours, etc.). The computer system 102 can also receive the network events in real-time or near real-time, as the packets 110A and 110B are passing through the network(s) 104. Sometimes, the computer system 102 can receive the network events in batch. Sometimes, the network(s) 104 can automatically transmit the network events to the computer system 102.

Once the computer system 102 receives the network events, the computer system 102 is tasked with associating the network events with users in the enterprise environment 100. For example, the computer system 102 can associate the packet 110A with the user 106A. The computer system 102 can also associate the packet 110B with the user 106B. As shown in FIG. 1, there is some disconnect between the user 106B and the user device 108B because, based on information in the received network events, the computer system 102 may only know the IP address associated with the user device 108B (YYY.YYY.YYY.YYY) but not an identity of the user 106B associated with the user device 108B. The user device 108B can be a shared computing device in the enterprise environment 100, in which users of the enterprise environment 100 can log in and use the device at different times. Therefore, the user device 108B can be associated with many different users. The computer system 102 can still make an association between the user 106B and the user device 108B using the disclosed techniques.

To make associations, the computer system can analyze the payload of the received network events (block B, 120). The payload can include data that a user, such as the user 106A, is sending to another user, such as user 106B. The payload can be analyzed to identify potentially unique identifiers in the data, such as email addresses, names, account names, a SENDER field, and/or a TO field. By analyzing the payload of either packet 110A or 110B, the computer system 102 can identify the unique identifiers and match those to unique identifiers in the user profiles data store 114. In other words, the computer system 102 can identify which users in the enterprise environment 100 are associated with which unique identifiers. By making this identification, the computer system 102 can associate such users to the network event of the particular packet 110A or 110B (block D, 124).

The computer system may also identify uniqueness in names in the payload in block B (120). For example, if a unique name is identified in the payload in the SENDER field, then the computer system can identify, from the user profiles in the data store 114, which user in the enterprise environment 100 is associated with that very unique name. The computer system 102 can then associate that user with the network event and with a high confidence value (block D, 124). After all, the name is unique and no one else in the enterprise environment 100 may have that name. The more users in the enterprise environment 100 who have that name, the lower the confidence value can be for such user-to-event associations.

As an illustrative example, the payload of the packet 110A can include a name "John Doe" in the SEND field. After receiving this packet in block A (118), the computer system 102 can analyze the payload and identify the name "John Doe" in the SEND field in block B (120). The computer system 102 can then search user profiles in the data store 114 to identify any profiles containing the name "John Doe." Many profiles may be returned to the computer system 102. Since many users in the enterprise environment 100 can be associated with the name "John Doe," this information may not be a strong indicator of which user is associated with the packet 110A (and thus, which user in the enterprise environment 100 is the sender, user 106A). The computer system 102 may associate each of the returned users with the packet 110A (block D, 124) but with low confidence values since the name is not unique and so many users are associated with the name "John Doe."

As another illustrative example, the SEND field in the payload of the packet 110A can include the name "Alexandria Malkistchz." The computer system 102 can search users profiles in the data store 114 to identify any profiles containing the name "Alexandria Malkistchz." This can be a unique name in the enterprise environment 100, and thus only one profile may be returned to the computer system 102. Accordingly, the computer system 102 can associate the packet 110A with the profile containing the name "Alexandria Malkistchz" with a high confidence value. In other words, the computer system 102 can identify the user 106A as "Alexandria Malkistchz."

Figure 4:
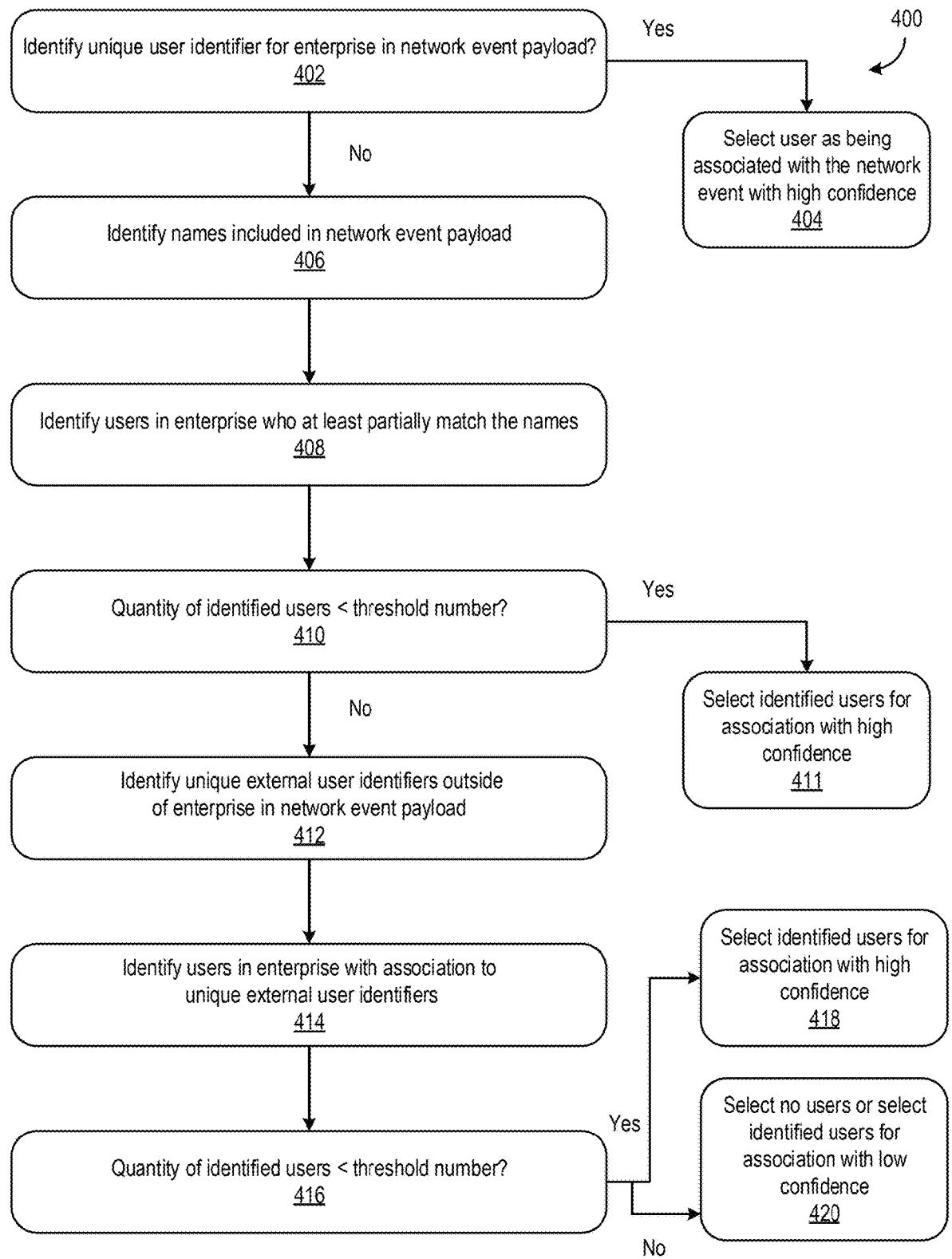
FIG. 4 is a flowchart of a process for associating users with network events and assigning confidence values for these associations based on unique user identifiers.

Refer to FIG. 4 for additional discussion about analyzing the payload.

The computer system 102 can also analyze device-IP logs to make associations between users and the received network events (block C, 122). Analysis of the device-IP logs can be performed in combination with analysis of the payload in block B (120). Thus, each of the blocks B and C (120 and 122, respectively) can be different tests executed by the computer system 102 to associate users to the network events. As described herein, associations made from execution of each of the tests can be assigned confidence values. The confidence values for a particular user can be aggregated (e.g., summed) in order to determine an overall confidence value of a user-to-event association. The overall confidence value can indicate a likelihood that the user should be attributed to the network event.

In block C (122), the computer system 102 can retrieve logs from the device-IP logs 112. Using the logs, the computer system 102 can look back in time to identify what user device had which IP address at what time. For example, the computer system 102 can identify a timestamp of when an email was sent from the payload of the packet 110A. The computer system 102 can then look through the logs to determine what user devices were identified by their IP addresses at or around the timestamp. The computer system 102 can identify user devices within a time buffer of the timestamp. The time buffer can be +−5 minutes. The time buffer can be any other length of time, including but not limited to +−2 minutes, +−8 minutes, +−10 minutes, etc. For example, the computer system can determine a host device at or around the timestamp associated with the packet 110A to then identify who was logged in and/or using that host device and thus may be associated with the packet 110A. A device ID and/or IP address of the device that was identified within the time buffer of the timestamp can be matched by the computer system 102 with profiles in the data store 114. Users of the matched profiles can then be associated with the packet 110A (e.g., the network event) (block D, 124).

As another example, the computer system 102 can identify the sender IP address as XXX.XXX.XXX.XXX in the packet 110A. The computer system 102 can then retrieve a log from the device-IP logs data store 112, and correlate a timestamp of the packet 110A with the sender IP address in the log. The computer system 102 can identify which user device was associated with the sender IP address at or around the timestamp of the packet 110A. The computer system can then determine which user is associated with the user device using one or more other sources, such as asset inventory files. In other words, the user device may be identified in the log by a device ID. The computer system 102 can retrieve asset inventory files and search the files for a user-to-device association using the device ID. Once the computer system 102 identifies the user associated with the user device, the computer system can associate the user to the packet 110A (e.g., the network event).

Sometimes, the computer system 102 can also access additional information, systems, and/or sources such as asset inventory files of the enterprise environment 100 to identify which user has been assigned to the host device or the other user device. If the host device happens to be a shared device, such as a computer in a community area, the computer system 102 may look at and weave together various log sources to identify the particular user who was logged into the shared device at or around the timestamp of the packet 110A. For example, the computer system 102 can analyze host device-based sources that indicate what users and/or user accounts logged into that device and at what times. The computer system 102 can therefore query a host device log to identify users that were logged into the device at or around the timestamp of the packet 110A (whether the user is on a network system or using a local client on the host device). The computer system 102 can also query the host device log to identify logout events and any other events that may be performed during a time between login and logout events to identify the user. Similar or other network authentication techniques can be used to identify the user associated with the host device at the timestamp of the packet 110A.

Sometimes, to identify a user of a shared device, the computer system 102 can request video data (e.g., security footage) of the shared device in the community area. The computer system 102 can look back through the video data to visually identify which user or users were using the shared device at or around the timestamp of the packet 110A.

Figure 5:
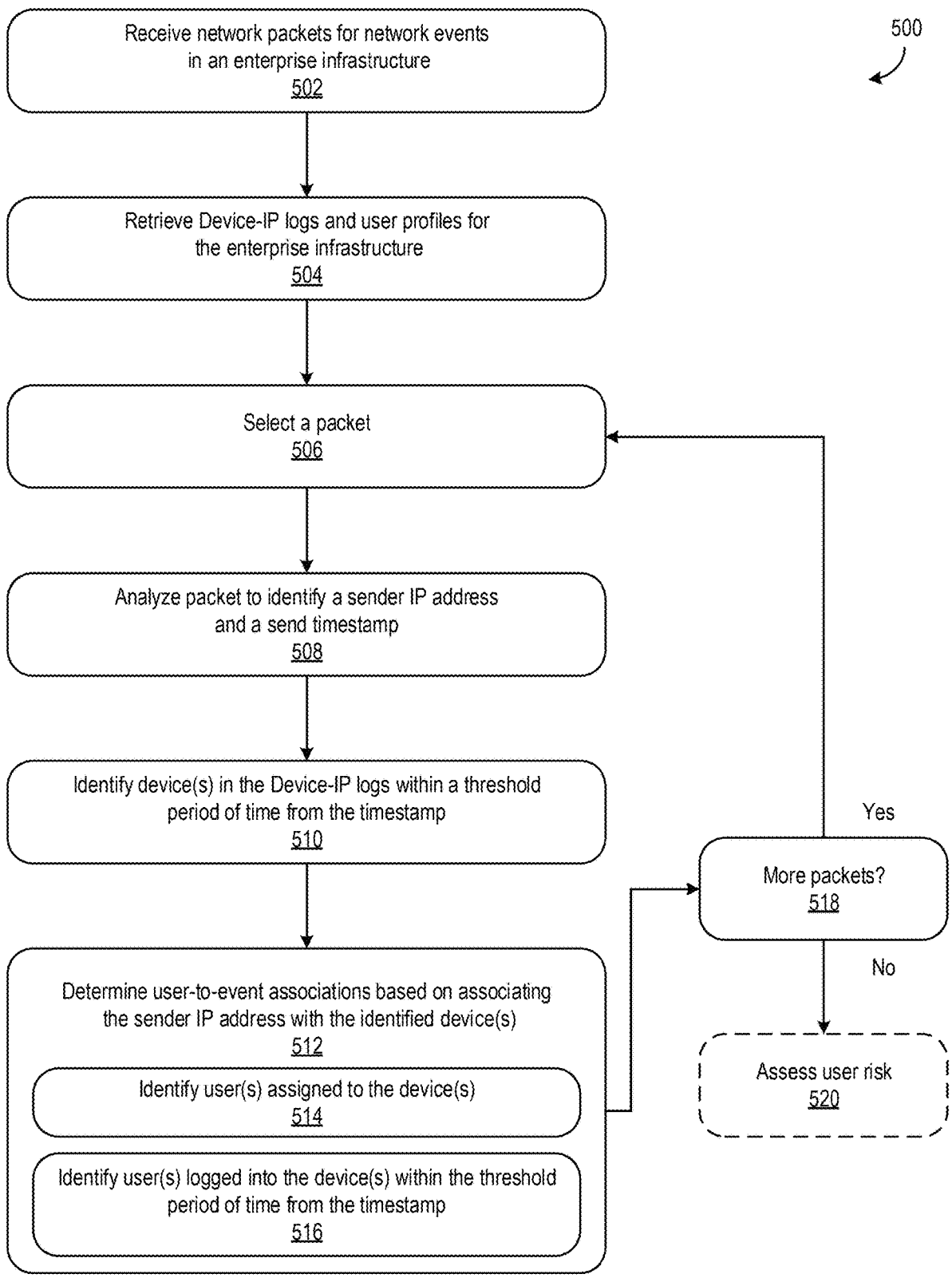
FIG. 5 is a flowchart of a process for associating users with network events based on IP addresses.

The computer system 102 can also look at other sources indicating what IP addresses were associated with the device at what times. Agents or other software can run on the host device to log events, which can then be analyzed by the computer system 102 in block C (122). One or more internal tools of the device and/or the enterprise environment 100 can also grab images of the device and activities thereon (e.g., a user downloading a file to a shared device), which can then be analyzed by the computer system 102 in block C (122). Refer to FIG. 5 for additional discussion about analyzing the device-IP logs.

As described above in reference to blocks B and C (120 and 122, respectively), the computer system 102 can make user-to-event associations in block D (124). Each time the computer system 102 associates a user to a network event, the computer system 102 can also assign a confidence value indicating confidence, or likelihood, that the user is in fact attributed to the network event. As described in reference to block B (120), the more unique a name or other unique identifier may be in the payload of the packet 110A, the higher the confidence value for that user-to-event association in block D (124). In reference to block C (120), the fewer users that are associated with the user device at or around the timestamp of the packet 110A, the higher the confidence for those user-to-event associations in block D (124).

Moreover, as described above, a user can be associated with a network event via both tests in blocks B and C (120 and 122, respectively). The user can then have two confidence values, which can be aggregated or summed by the computer system 102 to determine an overall confidence value for the association. The computer system 102 can then determine whether the overall confidence value is sufficient (e.g., exceeds some threshold level of confidence) to attribute the network event to the user and no other user in the enterprise environment 100.

In block D (124), the computer system 102 can generate user-to-event associations 130. These associations 130 can indicate what network events have been associated with which users in the enterprise environment 100 and the corresponding confidence values. For example, network event NE1 has been associated with user A (e.g., user 106A) with a confidence value of 80. Network event NE2 has been associated with users A and B (e.g., users 106A and 106B, respectively), with a confidence value of 60 for user A and a confidence value of 40 for user B. Sometimes, the computer system may determine that the network event NE2 should be attributed to user A because the respective confidence value exceeds some threshold confidence and/or the confidence value is significantly higher than the confidence value for user B. Network event NE3 can be associated with only user B with a confidence value of 100. Thus, the computer system 102 may attribute the network event NE3 to user B. Network event NE4 may be associated to only user B with a confidence value of 80. Sometimes, the computer system 102 may attribute the network event NE4 to only user B.

The confidence values shown in the associations 130 may be aggregations or sums of confidence values determined by performing the tests of both blocks B and C (120 and 122, respectively). For example, the network event NE1 can be associated with the user A using both tests of analyzing payload of NE1 for unique identifiers (block B, 120) and associating an IP address of NE1 with a device in the device-IP logs (block C, 122). The confidence value for analyzing the payload can be 60, because the unique identifier can include a very unique name that is only associated with one or few users in the enterprise environment 100. The confidence value for the device-IP logs analysis can be lower, at 20, because multiple devices can be logged in or used at or around the timestamp of NE1. When these confidence values are combined, however, the user A can be associated with NE1 with a high confidence value of 80.

The computer system 102 can also provide the user-to-event associations 130 to the risk assessment system 116 in block E (126). Using the associations 130, the risk assessment system 116 can assess user risk (block F, 128). For example, the risk assessment system 116 can determine how much risk or threat each of the users A and B pose to the enterprise environment 100. The risk assessment system 116 can also determine how much risk or threat each of the network events NE1-4 present to the enterprise environment 100. Such risk assessments can then be used by the computer system 102, another computer system, or a relevant stakeholder (e.g., a security analyst in the enterprise environment 100) to determine a response to activities of the user and/or the network events. As a result, the risk assessments can be used to prevent, mitigate, or otherwise respond to various security threats within the enterprise environment 100.

As an illustrative example, both users A and B can be associated with network event NE2 in block D (124). The computer system 102 can determine 60% confidence that user A is associated and 40% confidence that user B is associated with NE2. The risk assessment system 116 can determine that NE2 is a very risky activity (e.g., an activity that poses a significant security threat to the enterprise environment). Because NE2 can be classified as a very risky activity, the risk assessment system 116 (or the computer system 102) can assign all of the risk associated with NE2 to the user A, who has a confidence value that exceeds some threshold confidence (block F, 128).

As another illustrative example, 9 users can be associated with a network event in block D (124), and each user can have a confidence value of 10%, except 1 user, who has a confidence value of 20%. The risk assessment system 116 can determine that the network event is a very risky activity and thus poses a significant security threat to the enterprise.

Figure 3A:
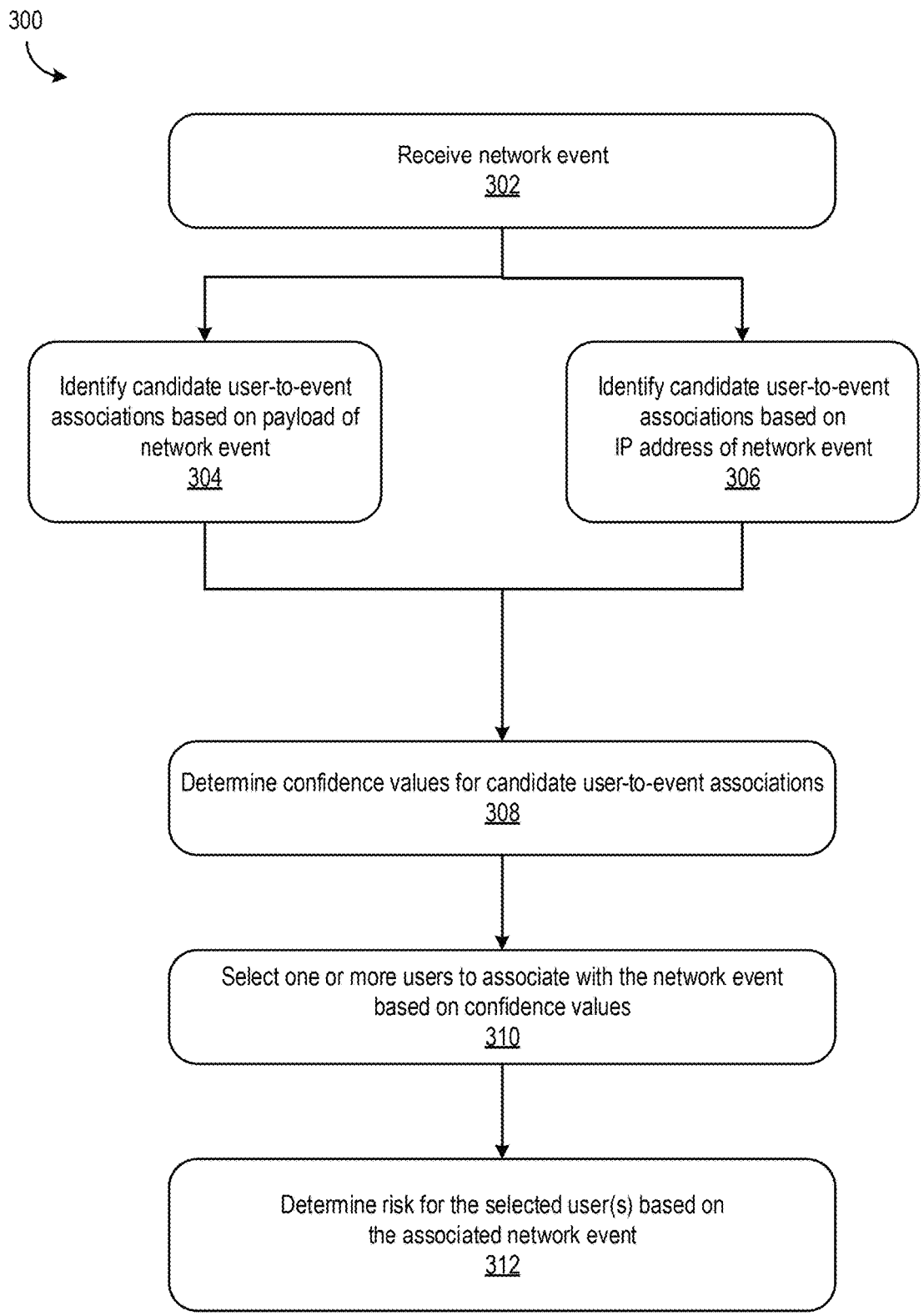
FIG. 3A is a flowchart of a process for associating users to network events in an enterprise environment.
Figure 3B:
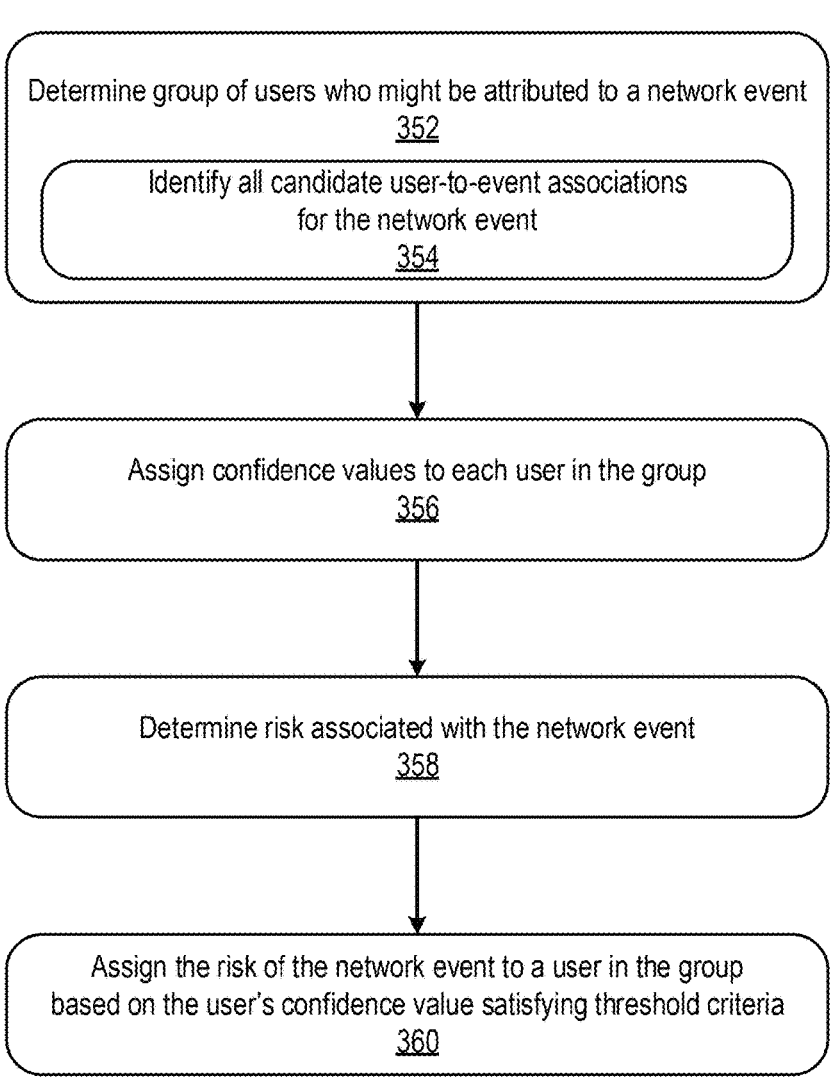
FIG. 3B is a flowchart of a process for assessing risk of users who may be attributed to a network event.

The risk assessment system 116 (or the computer system 102) can assign this network event to the 1 user having the highest confidence value because this network event is very risky (block F, 128). Thus a threshold for assigning the risk of the network event to a user can depend based on a risk assessment of the network event (e.g., how risky the network event is and/or how much of a security threat the network event poses to the enterprise environment 100). If, on the other hand, the risk assessment system 116 determines that the network event is not risky at all and is in fact a benign activity (thus the network event poses no security threat to the enterprise environment 100), the risk assessment system 116 may not assign this network event to any of the users. The network event may only be assigned to a user if the network event has some level of risk attributed to it. Refer to FIGS. 3A-B for additional discussion about attributing risk of network events to users who are associated with network events.

Figure 2:
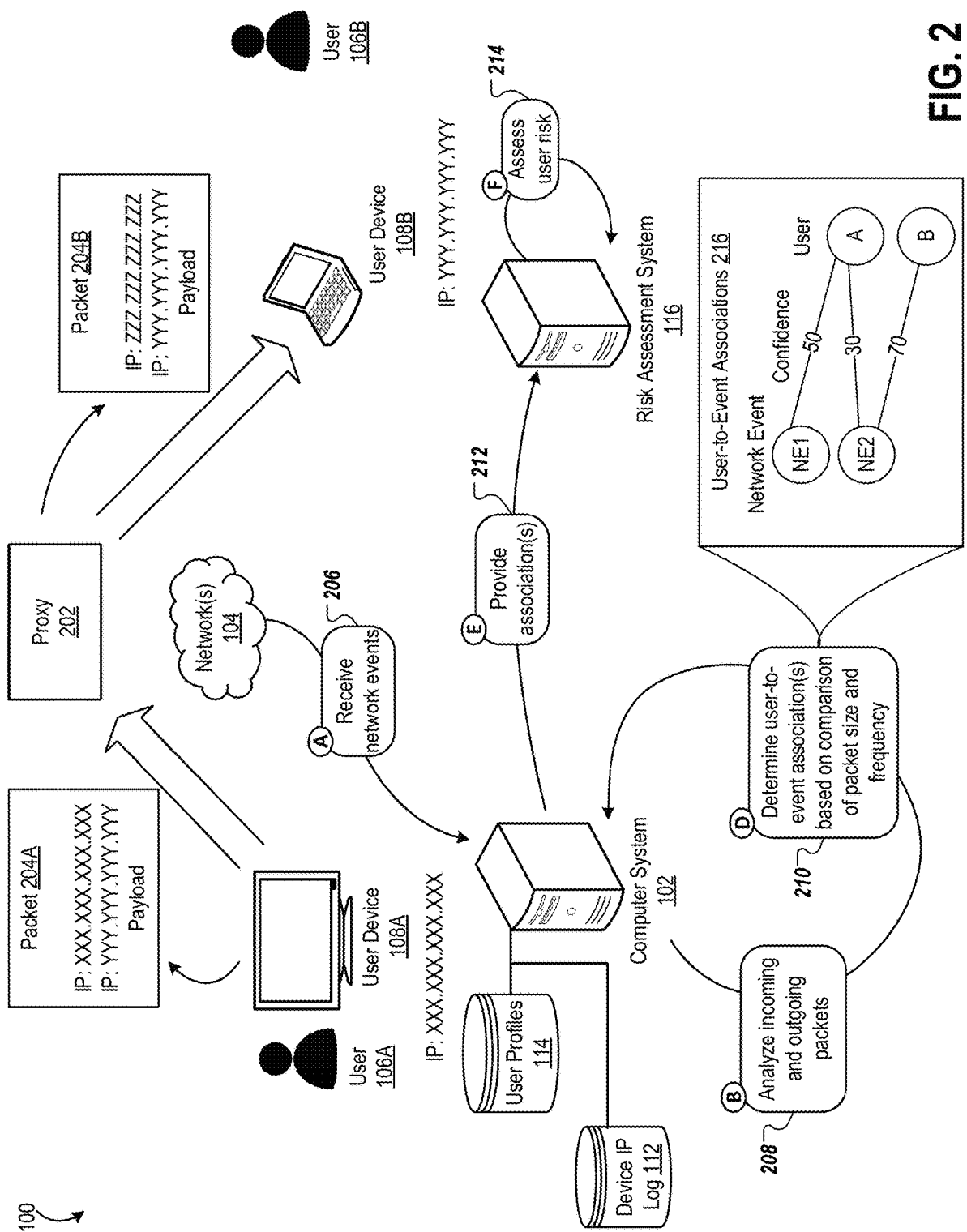
FIG. 2 is a conceptual diagram for attributing a user to a network event in the enterprise environment when the user acts through a proxy.

FIG. 2 is a conceptual diagram for attributing a user to a network event in the enterprise environment 100 when the user acts through a proxy 202. In the example of FIG. 2, the user 106A can transmit packet 204A over the network(s) 104 to the user device 108B using the proxy 202. The proxy 202 can be any type of firewall, computing system, server, and/or router that can act as an intermediary between one or more computing systems and/or devices. In some implementations, for example, the proxy 202 can be a virtual machine (VM) that can be spun up at the user device 108A and used to mask activities performed by the user device 108A, such as transmitting information to the user device 108B. Therefore, the user 106A at the user device 108A can attempt sending the information to the user device 108B through the proxy 202. As another example, the proxy 202 can be a tool such as a file sharing system or other third party system.

The user device 108A can transmit the packet 204A through the proxy 202. The proxy 202 can then mask elements in the packet 204A, such as the sender IP address, and thus transmit packet 204B to the user device 108B. As shown in the packet 204A in FIG. 2, the sender IP address of the user device 108A can be XXX.XXX.XXX.XXX. However, once the packet 204A is passed through the proxy 202, the resulting packet 204B masks the sender IP address as ZZZ.ZZZ.ZZZ.ZZZ, thereby obfuscating the actual sender IP address associated with user 106A.

Obfuscating the sender IP address can make it challenging for a computer system of the enterprise environment 100 to identify and associate the user 106A with the packet 204B (e.g., the network event). However, the disclosed techniques of the computer system 102 can be used to associate the packet 204B to the user 106A with high confidence.

As described in reference to FIG. 1, the computer system 102 can receive the network events from the network(s) 104 in block A (206). The network events can be or include the packets 204A and/or 204B.

The computer system 102 can then analyze incoming and outgoing packets in block B (208). The incoming packet can be the packet 204A. The outgoing packet can be the packet 204B. The computer system 102 can analyze these packets to identify and match packet size. Incoming and outgoing packets that have same or similar packet sizes (e.g., within some threshold size of each other) can be linked to each other and thus used to identify the user 106A. If the proxy 202 is external to the enterprise environment 100, the computer system 102 can identify traffic going to the proxy 202 (e.g., the packet 204A) and match that traffic to traffic coming into the enterprise environment 100 (e.g., the packet 204B). In some implementations, the computer system 102 may poll various external proxies for incoming and/or outgoing traffic in order to find a match between traffic that can then be used to identify the user 106A and associate the user 106A with a particular network event.

As an illustrative example, if the packet 204A has a packet size of approximately 5.1 MB and the packet 204B has a packet size of approximately 5.2 MB, the computer system 102 can determine that these incoming and outgoing packets are associated with each other and likely involve the same users (e.g., user 106A and 106B). Once this association or linkage is made, the computer system 102 can analyze the packet 204A to identify the user 106A and thus associate the user 106A with the network event that involves the linked packets 204A and 204B. The user 106A can be identified using any of the techniques described herein, such as payload analysis and device-IP logs analysis (e.g., refer to block B, 120, and block 2, 122, in FIG. 1).

In some implementations, the proxy 202 can be used locally within the enterprise environment 100 by the user 106A at the user device 108A. The user 106A can log onto proxy software, which can tunnel out of the enterprise environment 100. However, since the proxy is run locally, the computer system 102 can still receive network traffic since the computer system 102 can have network sensors on the edge (e.g., refer to FIGS. 7A-B). Accordingly, the computer system 102 can perform some hops in order to identify the user 106A as locally logging onto the proxy software. In some implementations where the proxy 202 is a locally spun up virtual machine (VM), the computer system 102 can identify, from logs of the host device, when a user signed into and out of the VM and/or when the user might have been kicked out of the VM (e.g., as result of a security event rule being triggered in the enterprise environment 100 that prevents the user from completing/performing suspicious activity). The logs can include IP addresses, which the computer system 102 can then trace back to user profiles in the data store 114 to identify the user who used the VM.

In some implementations, the computer system 102 can identify users associated with network events using beacon detection techniques. Beaconing techniques can be used by a host device, such as the user device 108A, in which the host device is infected and sends regular communications to an attacker-controlled host in order to communicate that the infected host device is alive and ready for instructions. The computer system 102 can analyze frequency and/or timing of such communications to detect beaconing and associate a user in the enterprise environment 100 to the beaconing. In some implementations, malicious software introduced by an internal actor that beacons out of the enterprise environment 100 can also be detected via regular cadence of network transmissions and analysis of similar packet sizes going to one or more than one external endpoint.

Moreover, in some implementations, the computer system 102 can identify users associated with network events based on how many user devices are transmitting information via the proxy 202, or a particular VPN. For example, if only one user device in the enterprise environment 100 reaches out to the proxy 202, the computer system 102 can infer that a user of that user device is associated with the network event that involves the transmission of information via the proxy 202. The computer system 102 can make this association with high confidence.

In block D, 210, the computer system 102 can make user-to-event associations based on a comparison of packet size and/or frequency, as described above. The computer system 102 can also determine a confidence value for each of the associations, as described in reference to FIG. 1. The computer system 102 can generate user-to-event associations 216, which can include network events that are associated with users. The associations 216 can also include confidence values for each of the associations made by the computer system 102.

In the example associations 216 of FIG. 2, the computer system 102 has identified network event NE1 with only user A. This association was assigned a confidence value of 50. The computer system 102 also identified network event NE2 with both users A and B. The computer system 102 assigned a confidence value of 30 for the association of NE2 with user A and a confidence value of 70 for the association of NE2 with user B.

The computer system 102 can provide the associations 216 to the risk assessment system 116 in block E (212). Accordingly, and as described in reference to FIG. 1, the risk assessment system 116 can assess risk of the users A and B in the associations 216 (block F, 214).

FIG. 3A is a flowchart of a process 300 for associating users with network events in an enterprise environment. The process 300 can be performed by the computer system 102. The process 300 can also be performed by one or more other computing systems, devices, computers, networks, cloud-based systems, and/or cloud-based services. For illustrative purposes, the process 300 is described from the perspective of a computer system.

Referring to the process 300, the computer system can receive a network event in block 302. Refer to block A (118) in FIG. 1 for additional discussion.

In block 304, the computer system can identify candidate user-to-event associations based on a payload of the network event. The computer system can also identify candidate user-to-event associations based on an IP address of the network event in block 306. As described in reference to FIG. 1 (e.g., refer to blocks B, 120, and C, 122, in FIG. 1), payload analysis and IP address analysis can be performed simultaneously and/or as separate tests by the computer system. Therefore, the computer system can perform a variety of tests in order to identify a user and associate the user with a network event. Performing the variety of tests can be beneficial to accurately associate the user with the network event with high confidence and without using personally identifying or private information of the user. Any of the candidate user-to-event associations made in blocks 304 and 306 can be stored in a data store.

The computer system can determine confidence values for each of the candidate user-to-event associations in block 308. Block 308 can be performed at a same time as each of the candidate user-to-event associations are made in blocks 304 and/or 306. An association can originally be assigned a confidence value of 0. This confidence value can then increase based on a variety of factors, including but not limited to uniqueness of an identifier in the payload, frequency of the network event for a particular user, a quantity of devices identified as having an IP address associated with the network event, etc. The confidence value can also be increased based on how many user-to-event associations are made for a particular network event. For example, the more users that are associated with the network event, the lower confidence value for any of those associations. On the other hand, the fewer users that are associated with the network event, the higher confidence value for any of those associations The confidence value can be increased by a predetermined amount. For example, the confidence value can be increased in increments of 10, where the confidence value can reach a maximum value of 100. One or more other numeric scales can be used for determining and allocating the confidence value.

In some implementations, the confidence value can be a Boolean or string value, such as Pass/Fail, True/False, High/Low, etc. Thus, if the computer system makes an association between a user and a network event, then the confidence value can be Pass, which means the computer system has confidence that the user is associated with the network event. If the computer system does not make an association between the user and the network event, then the confidence value can be Fail and thus the computer system may not make the association. In yet some implementations, if the computer system is 50% certain that the user is associated with the network event, then the computer system can make the association with a confidence value of Pass (indicating high confidence). If, on the other hand, the computer system is only 40% certain that the user is associated with the network event, then the computer system can still make the association, but this association can have a confidence value of Fail (indicating low confidence). One or more other threshold values can be used to determine whether the computer system has low confidence or high confidence for a candidate user-to-event association.

Still referring to block 308, the computer system can determine confidence values based on a variety of factors, as described throughout this disclosure. The computer system can perform name matching techniques to determine the confidence value for a particular candidate user-to-event association. For example, if only 1 user in the enterprise environment has sent information to a particular email or name and this is a 1:1 communication, the computer system can assign a high confidence value to an association between the 1 user and the network event. As another example, if only 1 user in the enterprise has a particular username (e.g., Alexandria.mzz111) and that user sends information to a recipient outside of the enterprise, this user to network event association can be assigned a high confidence value. After all, the particular username is so unique in the enterprise that no other user may have that username. On the other hand, if the particular username does not exactly match a known username in the enterprise (e.g., the username is a.mzz111 and the known username is Alexandria.mzz111), then the computer system may assign a lower confidence value to an association between the network event and the user whose username is Alexandria.mzz111. Similarly, if there is only one "Jane Doeeeee" in the enterprise, then an association between that user and a network event can have a high confidence value. However, if there are 50 "Jane Doe" in the enterprise, then each association between a Jane Doe and the network event can have a low confidence value.

As yet another example, if multiple users in the enterprise sent an email to a same external private email account, each of those users may be associated with the network event but with lower confidence values than if only 1 user in the enterprise sent an email to the external private email account. After all, multiple users in the enterprise may be emailing the same external private email account because that email account can be associated with a vendor or other relevant user to the business/functions of the enterprise.

In some implementations, the computer system can also determine the confidence value of an association based on alert chaining. In other words, the computer system can assess chains of behavioral events that are associated with a user in a candidate user-to-event association. If the user had been associated with a quantity of alerts exceeding some threshold level/range, the computer system can determine a high confidence value for the candidate user-to-event association. Similarly, if many events have been attributed back to the user, then the computer system can determine a higher confidence value for the candidate user-to-event association than if the user had only been attributed to one or no other events (or attributed to a quantity of events that is less than some threshold value/range).

As an example, a user can be associated with two network events: one for downloading malicious software and one for executing the software. These network events can be chained together and considered a single network event such that the user can be associated with the single network event with high confidence. On the other hand, if multiple users download the malicious software at a same or similar time, then the computer system may determine whether this network event is part of an alert chain for one user (e.g., a malicious actor) or whether all of the users had intentionally downloaded the software for non-malicious reasons, such as during a security training class. In the latter, the network event of downloading the software may not be chained with any other events and attributed to a particular user (or all the users who downloaded the malicious software).

In some implementations, as described in reference to FIG. 1, the computer system can associate the same user with the same network event in both blocks 304 and 306. Each of these associations can be assigned a confidence value. Therefore, the computer system can aggregate or sum these confidence values to determine an overall confidence value that the user is associated with the network event. Sometimes, the computer system can identify that the user has been associated with the network event using both tests in blocks 304 and 306 and then assign an overall confidence value. Thus, the computer system may not determine confidence values for each association of the user to the network event.

In block 310, the computer system can select one or more users to associate with the network event based on their confidence values. For example, the computer system can select all associations having confidence values that exceed some predetermined threshold confidence value. In some implementations, the computer system can select only an association having a highest confidence value. The computer system can select the user(s) in block 310 based on one or more other factors.

The computer system can also determine risk for the selected user(s) based on the associated network event (block 312). Block 312 can be performed by another system, such as the risk assessment system 116 described throughout this disclosure. The computer system can assess and determine a risk level (e.g., security threat level) of the network event to the enterprise environment. Using this risk level, the computer system can determine how to allocate risk of the network event to the selected user(s). For example, if the computer system determines that the network event has a very low risk level and thus is a benign activity, the computer system can determine that none of the selected users should be assigned the risk. On the other hand, if the network event has a high risk level and thus poses a significant security threat to the enterprise, the computer system can determine that one of the selected users should be assigned the risk. For example, the computer system can assign the risk of the network event (thus attributing the network event to the user) to the user having the highest confidence value. Risk for the selected users can also be determined using one or more other techniques, as described in reference to blocks D-F (124-128) in FIG. 1.

In some implementations, the process 300 can be executed upon identification of a new network event. The process 300 can also be executed on a scheduled basis, at one or more predetermined time intervals. Sometimes the process 300 can be executed on a scheduled basis depending on a cadence and/or size of a responding team. For example, the process 300 can be performed each morning before the workday begins for the responding team. As another example, the process 300 can be performed once a predetermined amount of network events are generated (e.g., 100 events).

FIG. 3B is a flowchart of a process 350 for assessing risk of users who may be attributed to a network event. The process 350 can be performed as part of block 312 in the process 300 described in FIG. 3A. The process 350 can be performed by the computer system 102 and/or the risk assessment system 116. The process 350 can also be performed by one or more other computing systems, devices, computers, networks, cloud-based systems, and/or cloud-based services. For illustrative purposes, the process 350 is described from the perspective of a computer system.

Referring to the process 350 in FIG. 3B, the computer system can determine a group of users who may be attributed to a network event in block 352. For example, the computer system can retrieve, from the data store, candidate user-to-event associations that were made in blocks 304 and/or 306 in the process 300 of FIG. 3A. In other words, the computer system can identify all candidate user-to-event associations that were made for a particular network event (block 354). Each of these candidate associations may include a different user in the enterprise environment.

The computer system can then assign confidence values to each user in the group in block 356. As described in reference to block 308 in the process 300 of FIG. 3A, the computer system can determine an overall confidence value for each user based on their user-to-event association(s) for the particular network event.

The computer system can also determine a risk associated with the network event in block 358. Refer to FIG. 1 and FIG. 3A for additional discussion about determining the risk.

In block 360, the computer system can assign the risk of the network event to a user in the group based on the user's confidence value satisfying some threshold criteria. As described in reference to FIG. 1 and FIG. 3A, the computer system can assign the risk of the network event to the user having the highest confidence value or a confidence value that exceeds some threshold confidence value. In addition or alternatively, the computer system can assign the risk to the user if the risk of the network event exceeds some threshold level of risk. Therefore, in block 360, the computer system can attribute the network event to a particular user in the enterprise.

FIG. 4 is a flowchart of a process 400 for associating users with network events and assigning confidence values for these associations based on unique user identifiers. The process 400 can be performed as part of block B (120) in FIG. 1, when payload of a network event is analyzed. The process 400 can be performed by the computer system 102. The process 400 can also be performed by one or more other computing systems, devices, computers, networks, cloud-based systems, and/or cloud-based services. For illustrative purposes, the process 400 is described from the perspective of a computer system.

Referring to the process 400 in FIG. 4, the computer system can determine whether a unique user identifier for the enterprise is identified in the network event payload (block 402). The unique user identifier for the enterprise can be a particular username and/or email address created and used within the enterprise. For example, the enterprise can have enterprise emails in the format of lastname.firstname@ABCcompany.com, which are given to each employee in the enterprise. In block 402, the computer system can determine whether the payload of the network event includes an enterprise email in the format of lastname.firstname@ABCcompany.com.

If the unique user identifier for the enterprise is identified, the computer system can select a user having the unique user identifier as being associated with the network event (block 404). The computer system can select the user based on accessing records, logs, or other data stored in a data store and linked to the enterprise. The accessed records, logs, or other data can include a list of employees and their respective enterprise usernames and/or email addresses. the computer system can identify a user in the accessed records, logs, or other data having the unique user identifier. The association made in block 402 can also be made with a high confidence value, especially since the unique user identifier may satisfy uniqueness criteria and/or no one else in the enterprise may be associated with that unique user identifier. After all, each employee of the enterprise is assigned a unique enterprise email address.

If a unique user identifier for the enterprise is not identified in block 402, the computer system can proceed to block 406. In block 406, the computer system can identify names included in the network event payload. The computer system can identify names that may be internal to the enterprise, such as first and/or last names of employees.

The computer system can identify users in the enterprise who at least partially match the names in block 408. For example, if the name identified in the payload is a last name, such as "Doe," the computer system can access records of the enterprise to determine whether the last name "Doe" matches the last name of any users, or employees, of the enterprise. As another example, if the name identified in the payload is "Annie Smith," the computer system can identify any users in the enterprise who have at least part of the name "Annie Smith." The identified users may, for example, only have a first name of "Annie" or "Ann" but not the full name "Annie Smith." The identified users may only have a last name of "Smith." In some implementations, the identified users may have a first name of "Smith." In yet some implementations, the identified users may have a middle name of "Ann," "Annie," or "Smith."

As another example, in block 408, the computer system can identify users in the enterprise who at least partially match a username, email address, or other unique identifier in the network event payload. A username in the payload can include any combination of a first and/or last name of an employee in the enterprise. Therefore, any user who has at least a portion of that first and/or last name (or a portion of the username) can be identified. Similarly, if the email address includes a combination of first and last name, complete first name and part of a last name, part of a first name and a complete last name, a first initial and a last name, or any combination thereof, the computer system can identify any users in the enterprise who match at least a portion of that email address. In some implementations, the more similarity or matching between the email address and a user in the enterprise, the higher confidence value assigned to a corresponding user-to-event association. Similarly, the more unique the email address (e.g., very users or only one user is associated with the email address), the higher the confidence value and the more common the email address (e.g., a greater number of users associated with the email address), the lower confidence value.

If a quantity of the identified users is less than a threshold number, then the computer system can select the identified users for association with the network event in block 411. The computer system can make these associations with high confidence values, since few of the users in the enterprise may at least partially match the names. In the above example, if only 2 users partially have the name "Annie Smith," then each of the 2 users can be associated with the network event and assigned high confidence values. In other words, it is more likely that either of these 2 users engaged in the network event.

On the other hand, if the quantity of the identified users is greater than the threshold number in block 410, the computer system can proceed to block 412. After all, too many users might have been identified as at least partially matching the name, which decreases a likelihood that any of those users are in fact linked to the network event. For example, if 50 users are returned as partially matching the name "Annie Smith," the computer system may have low confidence that any of these 50 users are associated with the network event. Therefore, the computer system can proceed to block 412 instead of associating the 50 users with the network event.

In block 412, the computer system can identify unique external user identifiers that are outside of the enterprise in the network event payload. These identifiers can include email address associated with private accounts or email services external to the enterprise, account names, usernames, etc.

The computer system can then identify users in the enterprise who are associated in some way to the unique external user identifiers in block 414. For example, the computer system can identify users who sent emails to a particular private email account. The computer system can also identify users who are linked to or otherwise operate a particular private email account.

The computer system can determine whether a quantity of the identified users is less than a threshold number in block 416. This determination can also be made based on strength of an association and/or frequency of the network event as it relates to a particular user. In other words, if one of the identified users only sent an email to the private email account over 5 years ago, then this is a less sufficient association and the frequency of this network event may be considered low. Thus, the computer system may not associate the user with the network event, or the computer system may associate the user with the network event but with a low confidence value. On the other hand, if the user is the only one in the enterprise who has emailed the private email account (such as frequently) whether recently or over/within some period of time, then the computer system can determine that the user is more likely associated with the network event. The computer system may associate the user with the network event with a high confidence value.

Accordingly, if the quantity of the identified users is less than the threshold number (and/or sufficiency of association criteria is met), the computer system can select the identified users for association with the network event in block 418. The computer system can make these associations with high confidence values.

If, on the other hand, the quantity of the identified users is greater than the threshold number (and/or sufficiency of association criteria is not met), then the computer system can select no users in block 420. The associations may be too weak to warrant associating any of the identified users with the network event. In some implementations, the computer system can select the identified users, or a portion of the identified users, for association with the network event but assign these associations low confidence values (block 420).

The blocks 402, 406-410, and 412-416 can be considered different tests that the computer system may execute in order to associate users with network events. Any of these tests can be executed in parallel or series. For example, the computer system can execute a test to associate users based on IP address, another test to associate users based on email address, and another test to associate users based on name. Each of these tests can return user-to-event associations and corresponding confidence values. As described herein, the computer system can then aggregate or sum all the confidence values determined while executing various tests in which the same user was associated with the same network event (e.g., a confidence value associating the user with the network event based on the user's name and another confidence value associating the user with the network event based on the user's IP address can be summed to determine the user's overall confidence value in association with the network event). Then, as described herein, the computer system can retrieve overall confidence values for all users that have been associated with the network event and identify which user exceeds some threshold confidence level or other criteria to be attributed the risk of the network event.

Accordingly, once users are selected and assigned confidence values in blocks 404, 411, 418, and/or 420, the user-to-event associations can be returned with their respective confidence values. The associations and their respective confidence values can be stored in a data store, as described herein. The computer system can then perform additional steps, as described in reference to the processes 300 and 350 in FIGS. 3A and 3B, respectively, to determine which of the selected users should be attributed to the network event and thus assigned risk of the network event.

FIG. 5 is a flowchart of a process 500 for associating users with network events based on IP addresses. The process 500 can be performed as part of blocks B and C (120 and 122, respectively) in FIG. 1. As described throughout this disclosure, the process 500 can be performed as one of the tests that can be executed by the computer system 102 to determine whether a user is associated with a particular network event. The process 500 can be performed by the computer system 102. The process 500 can also be performed by one or more other computing systems, devices, computers, networks, cloud-based systems, and/or cloud-based services. For illustrative purposes, the process 500 is described from the perspective of a computer system.

Referring to the process 500 in FIG. 5, the computer system can receive packets for network events in an enterprise infrastructure in block 502. For example, the computer system can receive packets for network events in a batch. Sometimes, the computer system can receive a packet in real-time and/or near real-time, when the network event is detected. Refer to discussion of block A (118) in FIG. 1 for additional discussion.

In block 504, the computer system can retrieve device-IP logs and user profiles for the enterprise infrastructure. As described throughout this disclosure, the computer system can retrieve the logs and/or profiles from a data store or multiple data stores, such as the device-IP logs data store 112 and the user profiles data store 114. In some implementations, the computer system may only retrieve the device-IP logs and then poll the data store 114 to identify user profiles that match an IP address identified in the process 500.

The computer system can then select a packet in block 506. In block 508, the computer system can analyze the selected packet to identify a sender IP address and a send timestamp. Payload analysis can also be performed in block 508 to check whether there is a unique identifier associated with the packet, as described throughout this disclosure. Thus, the computer system can perform multiple tests in parallel and/or series to identify whether a user is associated with a particular network event.

Next, the computer system can identify one or more devices in the device-IP logs within a threshold period of time from the timestamp (block 510). The computer system can look through the retrieved logs and identify which device or devices appear in the log around a time of the timestamp. The threshold period of time can vary. In some examples, the threshold period of time can be +−5 minutes. The threshold period of time can also be one or more other periods of time, including but not limited to +−1 minute, +−2 minutes, +−3 minutes, +−4 minutes, +−10 minutes, etc. Any of the devices that appear in the logs within the threshold period of time from the timestamp may be associated with the packet, and thus the network event.

The computer system can determine user-to-event associations based on associating the sender IP address with the identified devices in block 512. For example, the computer system can identify the user(s) assigned to the device(s) in block 514. The logs can indicate a device ID, a user ID, and/or an IP Address (e.g., the sender IP address). Any of these can be matched to the sender IP address and thus a user by reviewing the user profiles that are retrieved from the data store and identifying which of the user profiles contain the device ID, the user ID, and/or the IP address. The computer system can also identify users who have logged into the devices within the threshold period of time from the timestamp in block 516. Block 516 can be performed in scenarios when the identified devices in block 510 are shared/common computing devices.

In some implementations, as described throughout this disclosure, the computer system can determine confidence values for each of the user-to-event associations that are made in blocks 512-516. In some implementations, the computer system can determine the confidence values once all the associations are made, as described in reference to the process 350 in FIG. 3B.

Next, the computer system can determine whether there are more packets to analyze (block 518). If there are more packets, the computer system can return to block 506 and repeat blocks 508-516 for each remaining packet. If there are no more packets in block 518, then the computer system can optionally perform block 520. In block 520, the computer system can assess user risk based on the associations that were made in blocks 512-516. In some implementations, the process 500 can end. In yet some implementations, the computer system can store the associations and then the process 500 can end.

Figure 6:
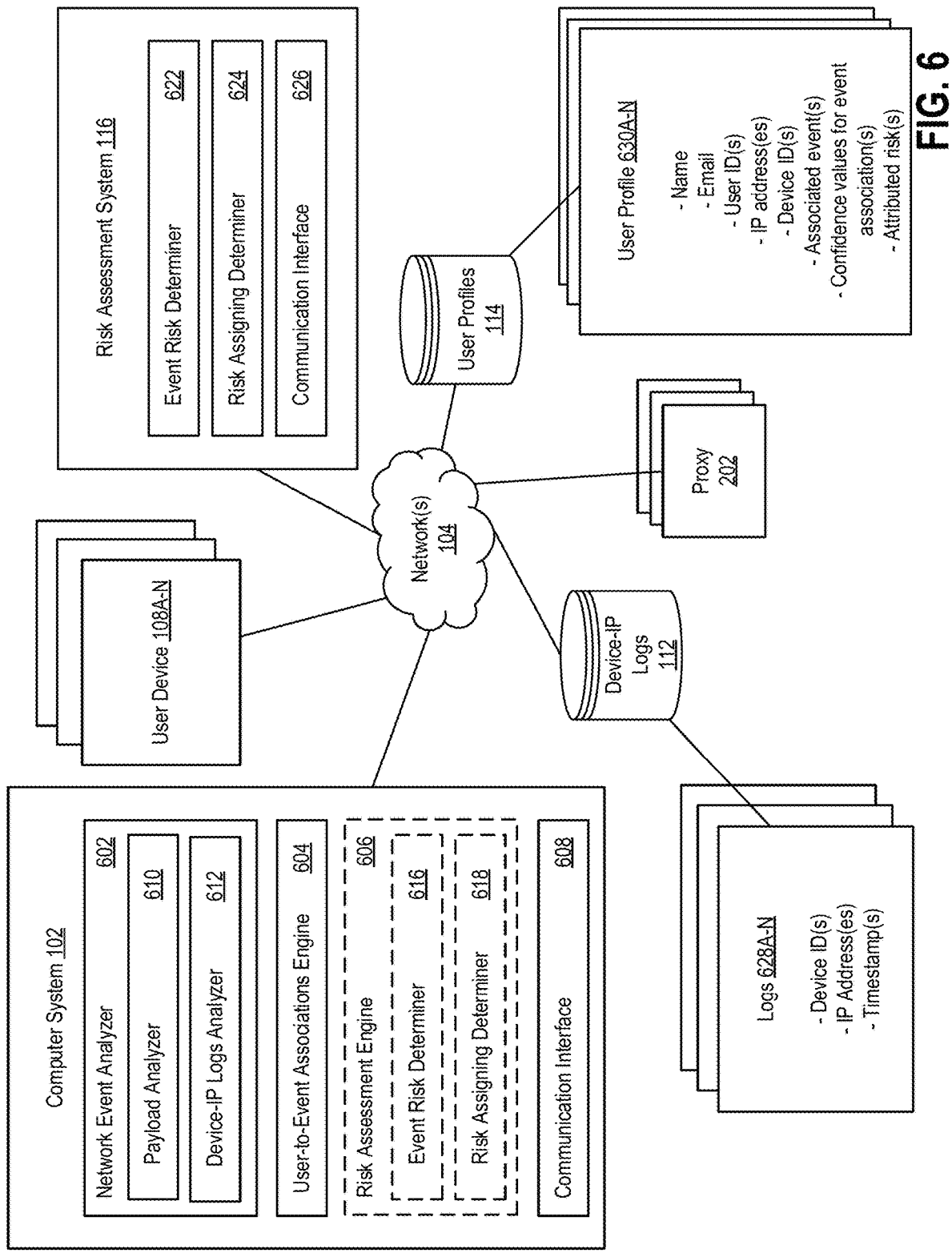
FIG. 6 is a system diagram depicting one or more components that can perform the techniques described herein.

FIG. 6 is a system diagram depicting one or more components that can perform the techniques described herein. As described, the computer system 102, user devices 108A-N, risk assessment system 116, device-IP logs data store 112, user profiles data store 114, and proxies 202 can communicate via the network(s) 104.

The computer system 102 can be configured to associate users with network events. The computer system 102 can include a network event analyzer 602, a user-to-event associations engine 604, an optional risk assessment engine 606, and a communication interface 608. The network event analyzer 602 can be configured to analyze packets associated with network events and, based on such analysis, associate the network events with users in the enterprise. The network event analyzer 602 can include a payload analyzer 610 and a device-IP logs analyzer 612.

The payload analyzer 610 can be configured to analyze payloads in the packets to identify unique user identifiers, such as names, email addresses, account names, etc. The analyzer 610 can then access user profiles 630A-N stored in the user profiles data store 114 to identify and match users in the enterprise with the identified unique user identifiers. The user profiles 630A-N can include information and data about the users that are part of the enterprise. The information and data can include but is not limited to a name (e.g., first, last, initials, etc.), email address (e.g., enterprise email address, external, private email address, etc.), user ID(s) (e.g., enterprise username, external account usernames, etc.), IP address(es), device ID(s) (e.g., for personal devices, enterprise-owned devices, common/shared devices, etc.), associated network event(s), confidence values for event associations, and attributed risks of network events. The user profiles 630A-N can also store additional information, such as risk scores of the user and historic logs and other data indicating events (malicious or non-malicious) that have been identified for the user. Refer to the process 400 in FIG. 4 for additional discussion about analyzing payloads.

The device-IP logs analyzer 612 can be configured to identify an IP address in a packet and match the IP address with a device in one or more logs 628A-N that are retrieved from the device-IP logs data store 112. The one or more logs 628A-N can each include device ID(s), IP address(es), and timestamps. The device ID(s) and/or IP address(es) can be matched with a particular user by accessing the user profiles 630A-N and comparing data in the use profiles 630A-N to the device ID(s) and/or IP address(es). Refer to the process 500 in FIG. 5 for additional discussion about identifying and analyzing IP addresses from packets of network events.

The user-to-event associations engine 604 can then associate users in the enterprise with the network events based on analysis performed by the network event analyzer 602 using the techniques described throughout this disclosure. In some implementations, the user-to-event associations engine 604 can also determine confidence values for associations that are made by the engine 604. The engine 604 can access user profiles 630A-N stored in the user profiles 114 to identify the users.

The optional risk assessment engine 606 can be configured to assess risk and allocate or attribute the risk to users who have been associated with network events. Accordingly, the engine 606 can include an event risk determiner 616 and a risk assigning determiner 618. The event risk determiner 616 can be configured to assess and determine risk of network events. Network event risks can be determined using mechanisms that identify high risk endpoints, volumetrics associated with traffic size, and/or file level analysis. Thus, using one or more of these mechanisms, contents of a network event can be assessed to determine whether the network event is potentially at-risk or risky to the enterprise.

The level or value of risk determined can indicate how much of a threat the network event may pose to the enterprise. For example, the higher the risk, the more of a security threat the event poses to the enterprise. The lower the risk, the less of a security threat the event poses to the enterprise. In some implementations, an event may have no level of risk, or a risk level of 0, which indicates that the event is a benign activity. Therefore, the event may not pose a security threat to the enterprise. If the event does not pose a security threat to the enterprise, then the user-to-event associations engine 604 may not associate any user with the event.

The risk assigning determiner 618 can be configured to assign risk of a network event to a user that has been identified in a user-to-event association. Thus, as described throughout this disclosure, the determiner 618 can identify a user having a highest confidence value amongst users who have been associated with a particular network event and assign the risk of the network event to that user. Therefore, the user who is most likely associated with the network event can be assigned all the risk of the network event. As another example, if all the users associated with a particular network event have the same confidence values, then the determiner 618 may not assign the risk of the network event to any of the users. After all, the determiner 618 is less certain which user is more likely associated with the network event.

Finally, the communication interface 608 can provide for communication between the components described herein.

The risk assessment system 116 can be configured to determine and assess risk of network events and users in the enterprise. As described throughout this disclosure, in some implementations, the system 116 can be part of the computer system 102. As shown in FIG. 6, the system 116 is separate from the computer system 102. The risk assessment system 116 can include an event risk determiner 622, a risk assigning determiner 624, and a communication interface 626. The event risk determiner 622 can perform same or similar techniques as the event risk determiner 616 described in reference to the risk assessment engine 604 of the computer system 102. The risk assigning determiner 624 can perform same or similar techniques as the risk assigning determiner 618 described in reference to the risk assessment engine 604 of the computer system 102. Finally, the communication interface 608 can provide for communication between the components described herein.

Figure 7A:
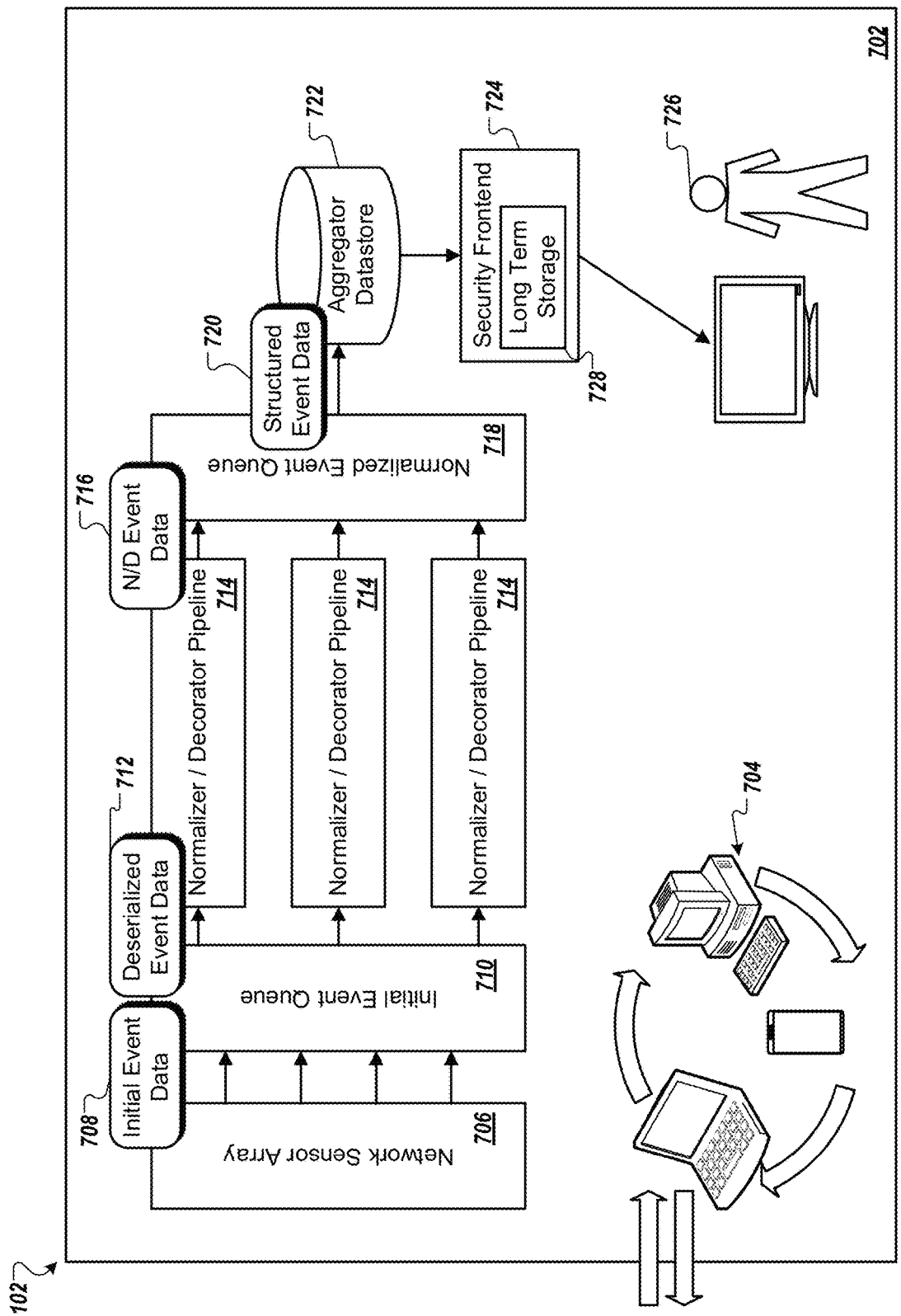
FIGS. 7A-B are block diagrams of an example system for generating events in response to network activity.
Figure 7B:
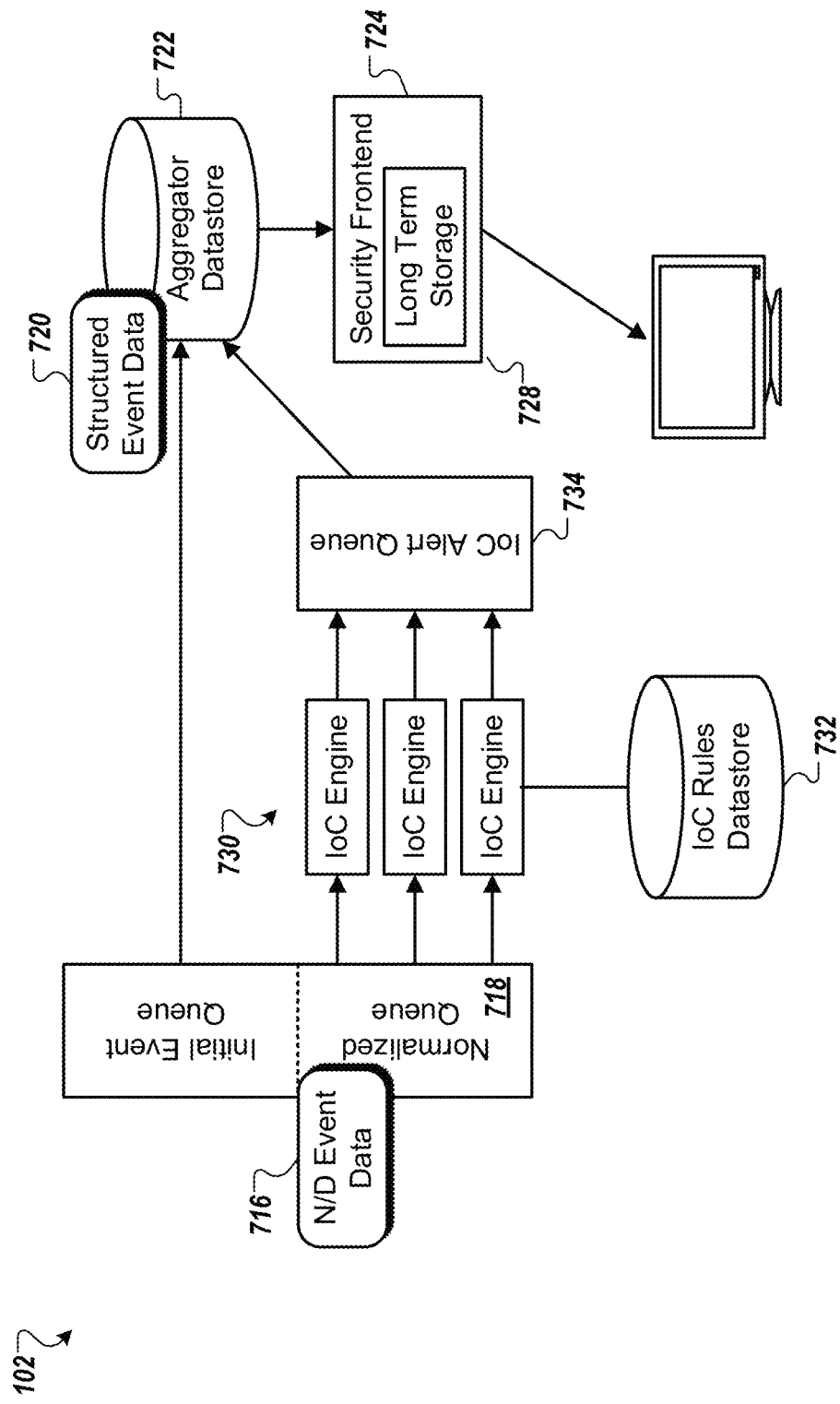

FIGS. 7A-B are block diagrams of an example system for generating events in response to network activity. The example system depicted in FIGS. 7A-B can be the computer system 102 described herein. In some implementations, the techniques described in reference to FIGS. 7A-B can be performed by another computing system, such as a different network security system.

Referring to FIG. 7A, a network 702 is being protected by one or more security analysts. The security analysts are users that are tasked with monitoring the security state of the network 702 and to prevent malicious activity like malware execution, data exfiltration, etc.

The network 702 is, for example, a local network, intranet, virtual private network, or other data network used by an enterprise. The network 702 can include networking hardware such as cables, wireless access points, routers, gateways, firewalls, etc., that work together to allow resident machines 704 to communicate with other resident machines 704 and with computing resources outside of the network 702. The resident machines 704 can include, but are not limited to, personal computers, servers, and mobile devices, such as the user device 104 described throughout this disclosure.

Operations of the network 702 and resident machines 704 may come under attack from malicious actors—users and/or automated services that seek to exploit computing resources they do not own or have authorization to use. The network security system 102 can be configured to provide monitoring functionality that generates data based on the activity on the network—including malicious activity, as described above. This monitoring can then be provided to a security analyst that is tasked with stopping or attempting to stop these attacks through various types of security responses.

When the resident machines 704 participate in data transmission on the network 702, an array of network security sensors 706 can sense the network activity and generate data for one or more events that represent the activity. For example, the sensors 706 can be connected to the physical layer of the network (e.g., wires, wireless data transmissions) and be configured to respond when signals indicate that network activity is happening. The sensors can respond to this sensing by creating data even when the sensed activity is not addressed to or involve the sensors 706. Depending on the size and scale of the network 702, one array of network sensors 706 may have more or fewer sensors than another array of network sensors. In various examples, hundreds, thousands, tens of thousands, or hundreds of thousands of sensors can be used, although more or fewer are possible. In addition or in the alternative, the sensors 706 can also record non-network activity. For example, when devices hosted on the network perform sensitive operations (e.g., accessing a sensitive data repository, executing applications, etc.), the sensors 706 can sense these activities.

The sensors 706 can provide the initial event data 708 to one or more initial event queues 710. The initial event data 708 may include data objects that do not conform to any single format or structure, may be out of chronological order, and may otherwise be non-homogeneous. The initial event queues 710 can receive the initial event data 708 and deserialize the data objects of the initial event data 708 into deserialized event data 712. The deserialized event data 712 can include all or part of the data included in the initial event data 708, and has been deserialized. In general, serialization of data involves the transforming or reconfiguring of data so that it can be stored, transmitted, etc. For example, the serialization process performed by the initial event queues 710 can include padding out short data strings or removing redundant data, decompressing compressed data, changing the format, etc.

One or more normalizer/decorator pipelines 714 can receive the deserialized event data 712 from the initial event queues 710 and process the deserialized event data 712 into normalized/decorated event data 716. For example, the normalizer/decorator pipelines 714 can normalize the deserialized event data 712 by editing its structure so that the structure complies with one or more standards, and the normalizer/decorator pipelines 714 can decorate the deserialized event data 712 by adding data to the events from other sources (e.g., timestamps, geo-location data, threat intelligence data, a connection-identifier.)

The number of normalizer/decorator pipelines 714 can change depending on the load of the initial event queues 710. For example, new instances of normalizer/decorator pipelines 714 can be generated and used when a backlog of deserialized event data 712 is prepared by the initial event queue 710, and these normalizer/decorator pipelines 714 can be released and idle when the backlog falls under a threshold size, is empty, begins trending downward, etc.

In some cases, the ramp-up of the normalizer/decorator pipelines 714 can be more sensitive than the ramp-down. That is, a particular growth in backlog may cause more normalizer/decorator pipelines 714 to be instantiated faster than a similar reduction in backlog. This may be accomplished, for example, by adding N normalizer/decorator pipelines 714 every time-unit (e.g., second, 30 seconds, minute, hour) a backlog over a certain size is seen, and removing only M normalizer/decorator pipelines 714 every time-unit the backlog over a certain size is not seen, where N is greater than M (e.g., N=2; M=1; e.g., N=4; M=1.) In addition to backlog size, other parameters are possible including, but not limited to, rate of change of backlog, priority of traffic resident in the backlog, price of allocation of resources, etc.

The network security system 102 can be configured to use the normalizer/decorator pipelines 714 to efficiently make matches and append flags to data. One such type of flag is an Indicator of Compromise (IoC) that records information a compromise. IoC can generally include single pieces of information that can be quickly examined and flagged. By using simple, single data matching, fewer computational resources may be required compared to more complex matching. By appending the IoC with the normalizer/decorator pipelines 714, later elements such as a security frontend 724 may be executed with less resources than would otherwise be needed. For example, the normalizer/decorator pipelines 714 can be configured to match in-network activity to lists of known malicious indicators. This includes hashes (MD5, SHA1 SHA256) of a known-malicious file (e.g. a document with a script containing malicious activity) or an IP address of an endpoint in a network communication. This configuration can tie IoCs to related data early in the process, removing a need to keep tables mapping network activity to IoCs for use later in the pipeline. Other types of matching include, but are not limited to, matching subdomains to top-level domains, use of regular expressions, etc.

An aggregator data store 722 can collect structured event data 720 and store the structured event data 720 in an indexable and searchable data store 722. The aggregator data store 722 may store all of the structured event data 720 until the aggregator data store 722 is full or otherwise storing at least a threshold amount of data or data older than a threshold period of time. When this volume or age of data is reached, the oldest data may be discarded, making room for new data. That is, the aggregator data store 722 may operate as a rolling buffer that provides storage for the new data, discarding the old data. Other storage systems (not shown here for clarity) can be used for long-term or archival storage, which may provide less expensive storage that is slower to respond to queries.

The security frontend 724 can provide a graphical user interface (GUI) to a computer and/or other devices used by a security analyst 726. The GUI can provide the security analyst 726 with access to the structured event data 720 that is stored in the aggregator data store 722 in a way that allows the security analyst 726 to understand and more quickly investigate security events of the network 702 that may or may not be malicious. For example, the GUI can provide the security analyst 726 with tools to draft queries, test the queries on the structured event data 720, and then store the same query for use as a rule on future events that are collected from the network 702.

In addition, the security frontend 724 can execute one or more rules on the incoming structured event data 720. These rules may contain conditional statements that, if ever found true on incoming event data, trigger response statements. These response statements can include instructions for automated responses (e.g., quarantining a device on the network 702, subjecting a data connection to enhanced analysis) as well as alerts to communicate the fact that a rule was triggered. These alerts may be transmitted to users via one or more channels that include email, text message, and the generation of a ticket in a ticketing system.

The use of the structure of the network security system 102 allows for efficient generation of alerts and processing of network events. For example, as shown here, both normalization and decoration of event data with IoCs can be performed as part of the ingestion of the network data instead of later once event data objects are created and ingested into storage. By using this type of architecture and performing decoration at the time of ingestion, the computing resources needed for decoration can be reduced. As done here, decoration with IoCs can be as simple as maintaining a dictionary of key:value pairs for various fields, and as the normalizer/decorator pipelines 714 normalizes the event data, the event data value can be run through the dictionary.

Any hits in the dictionary, where a field of the event data object matches a key entry, can result in the copying of the key:value pair to the event data object. As will be understood, this can be implemented in a very efficient and thus fast-to-process format that scales slowly as the number of events grows and as the size of the dictionary grows. By way of comparison, decorating events after they already are stored in a datastore can involve far more complex Boolean operations, repetitive traversals, etc. that have the result of becoming less performant as the number of events or size of the dictionary grows.

In this way, extensive and fine-grain event generation, storage, and analysis can be created with the network security system 102. In one example, an enterprise data network that connects hundreds of physical locations and millions of devices can be effectively and efficiently monitored. In this example, tens of thousands sensors 706 can produce tens of trillions of events a day (including hundreds of thousands or millions of events a second). The event-based monitoring system 404 can be created using hardware resources that may be well within an enterprise of this size and scope, and provide access to events in the aggregator datastore 722 within seconds of the event occurring on the network. Further, the rules may be run on the events every minute or every handful of minutes.

Further, the use of a rolling buffer in the aggregator datastore 722 can ensure that the most relevant events—the newest ones—are always available for analysis. In the above example, a week's worth of events can be stored in the rolling buffer. Some indexing can be built on the entire week's worth of data, with enhanced indexing being built on the newest data. In this way, rules to identify potentially malicious activity can be run on the newest data at high speed and efficiency, without requiring re-indexing of all data.

FIG. 7B is a block diagram of optional elements of the network security system 102. As shown here, the normalized event queue 718 can include one or more normalized queues from which network event data can be provided to IoC engines 730 for processing against IoC rules. The IoC engines 730 can receive network event data, either structured or unstructured, along with other pertinent data to the event data, such as additional information added to the network event data in the normalizer/decorator pipelines 714. The IoC engines 730 can access one or more IoC rules from the IoC rules datastore 732 and compare the normalized event data 716 against these rules. If a normalized event data 716 matches an IoC rule, the event data can be decorated with information about the IoC rule, such as a flag or code associated with the matching rule being added to the event data that indicates the implications of the match (e.g., domain for network event is known bad/malicious domain, etc.). These decorated events can be provided to the aggregator datastore 722 for processing against the more computationally intensive rules.

The rules in the IoC rules datastore 732 can include one or more rules that are easy to process (e.g., require few computational resources to run) relative to the rules run against the aggregator datastore 722. Bifurcating processing of the more computationally simple IoC rules from the more complex rules run against the aggregator datastore 722 across different systems can create greater processing efficiency and use of processing resources. The IoC rules can include, for instance, simple pattern or string matching tests. For example, one test may be to compare an MD5 hash of an email attachment against a corpus of MD5 hashes from known-malicious historical email attachments. Since MD5 hashes are not truly unique and hash-collisions of different files are possible, this processing can provide a likely indicator of potentially malicious email traffic. However, because comparing MD5 hashes are computationally simple, this test can be performed quickly and can provide an efficient determination of potentially malicious events.

In some implementations, the IoC rules datastore 732 can include a dynamic rules engine to perform comparison based on the rules stored in the IoC rules datastore 732. When the rules change, the IoC rules datastore 732 can detect the change and initiate an engine rebuild to create a second rules engine using the updated rules. While the rebuild is being performed, traffic can continue to be routed to the first, older, rules engine. Then, when the rebuild is completed, the IoC rules datastore 732 can route new traffic to the second rules engine. Once all the traffic routed to the first rules engine is acted upon, the IoC rules datastore 732 can decommission the old rules engine.

The IoC engine deposits the structured event data 720 into an IoC alert queue 734. The IoC alert queue 734 can collect the received structured event data 720 for storage in the aggregator datastore 722. As described in reference to FIG. 7A, the structured event data 720 can then be outputted in GUIs at user devices of the security analysts.

Figure 8:
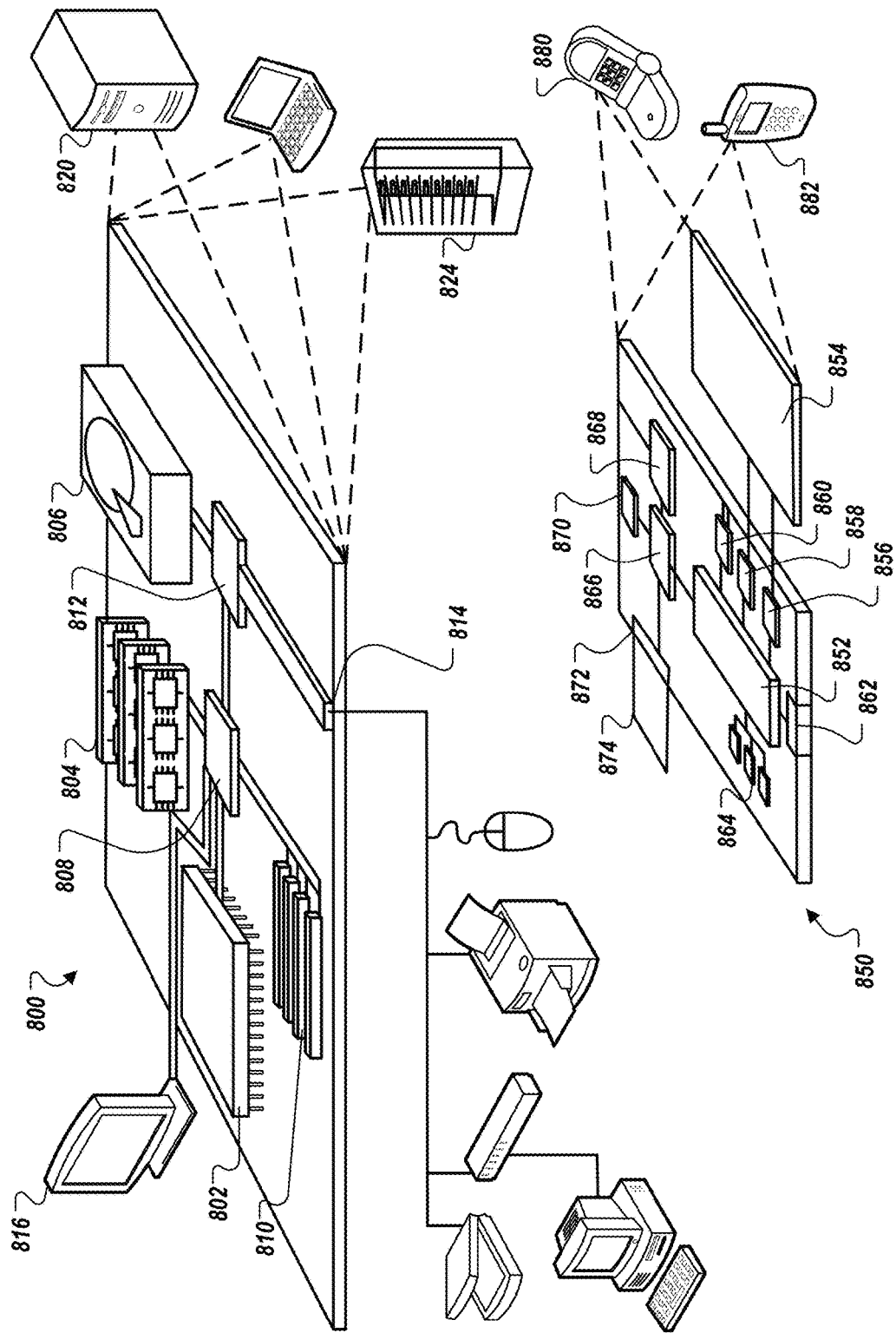
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 854 can also be provided and connected to the mobile computing device 850 through an expansion interface 852, which can include, for example, a SIMM (Single In Line Memory Module) card interface. The expansion memory 854 can provide extra storage space for the mobile computing device 850, or can also store applications or other information for the mobile computing device 850. Specifically, the expansion memory 854 can include instructions to carry out or supplement the processes described above, and can include secure information also. Thus, for example, the expansion memory 854 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 854, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 850 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for associating users of a network infrastructure to network events and endpoint events within the network infrastructure, the method comprising:
    receiving, by a network security system that is configured to monitor and protect the network infrastructure, a packet for a network event in the network infrastructure, wherein the packet includes (i) information identifying a user device from which the network event originates and (ii) a payload;
    determining, by the network security system, whether the packet triggers at least one association rule in a plurality of association rules;
    determining, by the network security system, one or more candidate users to be associated with the network event based on the at least one association rule triggered by the packet;
    determining, by the network security system, one or more confidence values for the one or more candidate users to be associated with the network event based on the at least one association rule triggered by the packet; and
    returning, by the network security system, the one or more candidate users to associate with the network event and the one or more confidence values.

2. The method of claim 1, wherein the payload includes at least one of a username of the network infrastructure, a username of an external service, an email address of the network infrastructure, an email address of an external email service, a first name, and a last name.

3. The method of claim 1, wherein determining, by the network security system, whether the packet triggers at least one association rule in a plurality of association rules comprises analyzing incoming and outgoing packets based on:
    identifying at least one of a packet size and a packet frequency of an incoming packet;
    identifying at least one of a packet size and a packet frequency of an outgoing packet; and
    determining whether at least one of the packet size and the packet frequency of the incoming packet is within a threshold range of at least one of the packet size and the packet frequency of the outgoing packet.

4. The method of claim 3, wherein determining, by the network security system, whether the packet triggers at least one association rule in a plurality of association rules comprises analyzing incoming and outgoing packets is based on associating the incoming packet with the outgoing packet based on a determination that at least one of the packet size and the packet frequency of the incoming packet is within the threshold range of at least one of the packet size and the packet frequency of the outgoing packet.

5. The method of claim 4, wherein determining, by the network security system, whether the packet triggers at least one association rule in a plurality of association rules comprises analyzing incoming and outgoing packets is further based on:
    identifying a user from at least one of an IP address and a payload of the outgoing packet; and
    associating the user with the incoming packet and the outgoing packet.

6. The method of claim 1, wherein determining, by the network security system, whether the packet triggers at least one association rule in a plurality of association rules comprises analyzing the payload.

7. The method of claim 6, wherein analyzing the payload comprises:
    identifying, by the network security system, a unique user identifier for the network infrastructure in the payload, wherein the unique user identifier is at least one of a username of the network infrastructure and an email address of the network infrastructure;
    associating, by the network security system, a user having the unique user identifier with the network event; and
    determining, by the network security system, a confidence value for the candidate user-to-event association that is greater than a threshold value.

8. The method of claim 6, wherein analyzing the payload comprises:
    identifying, by the network security system, names included in the payload, wherein the names include at least one of a first name, a last name, a first initial, and a last initial;
    identifying, by the network security system, user profiles in the network infrastructure that at least partially match the names;

determining, by the network security system, whether a quantity of the identified user profiles is less than a threshold quantity;

associating, by the network security system, the identified user profiles with the network event; and determining, by the network security system, a confidence value for each of the candidate user-to-event associations that is greater than a threshold value.

9. The method of claim 6, wherein analyzing the payload comprises:

identifying, by the network security system, a unique external user identifier in the payload, wherein the unique external user identifier is at least one of a private email address, an external username, and an external account identifier;

identifying, by the network security system, user profiles in the network infrastructure that include the unique external user identifier;

determining, by the network security system, whether a quantity of the identified user profiles is less than a threshold quantity;

associating, by the network security system, the identified user profiles with the network event; and determining, by the network security system, a confidence value for each of the candidate user-to-event associations that is greater than a threshold value.

10. The method of claim 9, further comprising:

associating, by the network security system, the identified user profiles with the network event based on a determination that the quantity of the identified user profiles is greater than the threshold quantity; and determining, by the network security system, a confidence value for each of the candidate user-to-event associations that is less than the threshold value.

11. The method of claim 1, wherein determining, by the network security system, whether the packet triggers at least one association rule in a plurality of association rules comprises analyzing a device-IP log based on:

analyzing the packet to identify a sender IP address and an event timestamp;

identifying at least one device in the device-IP log within a threshold period of time from the timestamp; and determining one or more candidate users to be associated with the network event based on associating the sender IP address with the at least one identified device in the device-IP log.

12. The method of claim 11, wherein the determining, by the network security system, one or more candidate users to be associated with the network event comprises identifying at least one of: (i) at least one user profile assigned to the at least one device and (ii) at least one user profile logged into the at least one device within the threshold period of time from the timestamp.

13. The method of claim 1, wherein determining, by the network security system, one or more confidence values for the one or more candidate users to be associated with the network event comprises assigning at least one of the one or more confidence values above a threshold level based on a determination that a name in the payload is attributed to a quantity of user profiles in the network infrastructure that is less than a threshold quantity.

14. The method of claim 1, wherein determining, by the network security system, one or more confidence values for the one or more candidate users to be associated with the network event comprises assigning at least one of the one or more confidence values above a threshold level based on a determination that (i) information in the payload is attributed to a quantity of user profiles in the network infrastructure that is less than a threshold quantity and (ii) a frequency that the information in the payload is attributed to the quantity of user profiles in the network infrastructure is greater than a threshold frequency.

15. The method of claim 1, wherein determining, by the network security system, one or more confidence values for the one or more candidate users to be associated with the network event comprises assigning at least one of the one or more confidence values above a threshold level based on a determination that (i) information in the payload is attributed to a quantity of user profiles in the network infrastructure that is less than a threshold quantity, (ii) a frequency that the information in the payload is attributed to the quantity of user profiles in the network infrastructure is greater than a threshold frequency, and (iii) a window of time in which the information in the payload is attributed to the quantity of user profiles in the network infrastructure is within a threshold time period.

16. The method of claim 1, further comprising selecting, by the network security system, at least one of the one or more candidate users to associate with the network event based on a confidence value of the at least one candidate user exceeding a threshold confidence value.

17. The method of claim 16, further comprising:

determining, by the network security system, a risk level of the network event; and assigning, by the network security system, the risk level of the network event to the at least one user based on the confidence value of the at least one user exceeding confidence criteria.

18. The method of claim 1, further comprising:

retrieving, by the network security system, confidence values for a user of the one or more candidate users based on the packet triggering association rules in the plurality of association rules;

summing, by the network security system, the confidence values for the user to generate an overall confidence value that the user is associated with the network event; and returning, by the network security system, the overall confidence value for the user.

19. The method of claim 18, further comprising:

retrieving, by the network security system, overall confidence values for users that are associated with the network event or an endpoint event;

identifying, by the network security system, a user having a confidence value that exceeds a threshold confidence level; and attributing, by the network security system, the network event or the endpoint event to the identified user based on assigning risk associated with the network event or the endpoint event to the identified user.

20. A system for associating users of a network infrastructure to network events or endpoint events within the network infrastructure, the system comprising:

at least one processor; and a memory device storing instructions that are operable, when executed by the at least one processor one or more computers, to cause the at least one processor to perform operations comprising:

receiving a packet for a network event in the network infrastructure, wherein the packet includes (i) information identifying a user device from which the network event originates and (ii) a payload;

determining whether the packet triggers at least one association rule in a plurality of association rules;

determining one or more candidate users to be associated with the network event based on the at least one association rule triggered by the packet;

determining one or more confidence values for the one or more candidate users to be associated with the network event based on the at least one association rule triggered by the packet; and returning the one or more candidate users to associate with the network event and the one or more confidence values.

\* \* \* \* \*